(12) United States Patent
Tanaka et al.

(10) Patent No.: US 6,579,956 B2
(45) Date of Patent: Jun. 17, 2003

(54) METHOD FOR PRODUCING A POLYMER BY COORDINATION POLYMERIZATION

(75) Inventors: Hiromitsu Tanaka, Aichi (JP); Bruce M. Novak, Raleigh, NC (US)

(73) Assignees: Kabushiki Kaisha Toyota Chuo Kenkyusho, Aichi-gun (JP); University of Massachusetts, Boston, MA (US)

(*) Notice: Subject to any disclaimer, the term of this patent is extended or adjusted under 35 U.S.C. 154(b) by 110 days.

(21) Appl. No.: 09/875,036

(22) Filed: Jun. 7, 2001

(65) Prior Publication Data

US 2002/0032288 A1 Mar. 14, 2002

Related U.S. Application Data

(63) Continuation-in-part of application No. 09/343,520, filed on Jun. 30, 1999, now abandoned.

(51) Int. Cl.$^7$ ...................... C08F 120/04; C08F 130/04; C08F 216/02; C08F 220/04
(52) U.S. Cl. .................. 526/75; 526/239; 526/240; 526/274; 526/277; 526/286; 526/288; 526/303.1; 526/308; 526/310; 526/311; 526/317.1; 526/318.6; 526/348.8; 526/160; 526/161; 526/241
(58) Field of Search .................. 526/75, 239, 240, 526/241, 274, 277, 286, 288, 303.1, 308, 310, 311, 317.1, 318.6, 348.8, 160, 161

(56) References Cited

U.S. PATENT DOCUMENTS 5,153,282 A * 10/1992 Datta et al. .................... 526/75

OTHER PUBLICATIONS

Yang, X. et al., J. Am. Chem. Soc., vol. 113, No. 9, 1991, pp. 3623–3625.

* cited by examiner

*Primary Examiner*—David W. Wu
*Assistant Examiner*—R. Rabago
(74) *Attorney, Agent, or Firm*—Oblon, Spivak, McClelland, Maier & Neustadt, P.C.

(57) ABSTRACT

A method for producing a polymer by coordination polymerization, comprising the steps of (a) reacting an unsaturated polar monomer having a functional group releasing a proton or a salt of the unsaturated polar monomer, with a masking agent comprising a halogenated organometallic compound or a organoaluminum compound capable of masking the functional group to form a corresponding masked monomer; and (b) polymerizing the masked monomer either alone or in combination with another monomer in the presence of the coordination polymerization catalyst to obtain the polymer.

24 Claims, 12 Drawing Sheets

METHOD FOR PRODUCING A POLYMER BY COORDINATION POLYMERIZATION

RELATED APPLICATIONS

This is a Continuation-In-Part application of U.S. patent application Ser. No. 09/343,520 filed on Jun. 30, 1999, now abandoned.

BACKGROUND OF THE INVENTION

1. Field of the Invention

This invention relates to a method for producing a polymer by coordination polymerization.

2. Description of the Related Art

When the catalyst combining titanium tetrachloride and triethylaluminum (Ziegler catalyst) is used to polymerize ethylene, the polymerization proceeds at a low pressure while an ethylene monomer is being coordinated to the metal of the catalyst and produces polyethylene having very small degree of branching. The mechanism of such polymerization is referred to as "coordination polymerization" and it is a very effective method for producing polyolefins with high stereoregularity.

In the coordination polymerization of olefin monomers, widely used are, aside from Ziegler catalyst, Natta catalyst combining titanium trichloride and triethylaluminum, the so-called Kaminsky catalysts that are represented by a combination of bis(cyclopentadienyl)titanium dichloride ($Cp_2TiCl_2$) and methylaluminoxane (the reaction product of methylaluminum and water), and the like. They can produce a variety of polyolefins having remarkably high stereoregularity and excellent physical properties as compared with polyolefins that are polymerized by radical polymerization methods.

It is also known that a polymerization of ethylene proceeds rapidly at 25° C., and 1 atm pressure to form a polyethylene with high stereoregularity when tris (pentafluorophenyl)boron ($B(C_6F_5)_3$) is used as a cocatalyst in combination with zirconocene catalyst such as bis (cyclopentadienyl)dimethylzirconium ($Cp_2ZrMe_2$) (Xinmin Yang, et al., J. Am. Chem. Soc. 1991, 113, 3623–3625).

Recently, there have been developed coordination polymerization catalysts (the so-called Brookhart catalysts) that are represented by α-diimine nickel complexes; thus, they have made it possible to copolymerize olefin monomers with various unsaturated monomers.

However, a problem with the coordination polymerization catalysts described above is that it is difficult for polar monomers, especially unsaturated monomers capable of releasing a proton, to undergo coordination polymerization. Thus, when an unsaturated monomer, e.g., acrylic acid, having a functional group capable of releasing a proton and an olefin monomer, e.g., ethylene, are to copolymerize in the presence of an above described catalyst, the reaction does not take place at all, or at least, the yield of the product will be very low, because the unsaturated monomer having a functional group capable of releasing a proton lowers the reactivity of the coordination polymerization catalyst.

On the other hand, radical polymerizations are not easily influenced by the unsaturated monomers having functional groups capable of releasing a proton; therefore, use of the radical polymerization will enable the above-described monomers to copolymerize. However, the problem of low crystallinity of the resulting copolymers arises, because of their insufficient stereoregularity. In addition, since radical polymerization requires high temperature and high pressure reaction conditions, they are not favorable economically.

In an attempt to overcome these disadvantages, U.S. Pat. No. 5,153,282 discloses a method to convert a polar mononer into a masked monomer utilizing a masking agent comprising a non-halogenated metallic compound and to use the masked monomer for polymerization.

SUMMARY OF THE INVENTION

This invention has been made in view of these technical problems and is directed at providing a method for the production of a polymer which allows even a monomer having a functional group releasing a proton, that lowers the reactivity of a coordination polymerization catalyst, to undergo coordination polymerization.

The present inventors have repeated thorough investigations in order to attain the objective described above. As a result, it has been discovered that after a monomer having a functional group releasing a proton, that lowers the reactivity of a coordination polymerization catalyst, has been masked with a masking agent comprising (i) a halogenated organometallic compound having a specific chemical structure or (ii) a organoaluminum compound having a specific chemical structure to form a masked monomer, the use of this masked monomer as a polymerization monomer will permit the production of a polymer through coordination polymerization. This invention has thus been accomplished.

Specifically, the first embodiment of the method for producing a polymer by coordination polymerization according to this invention is characterized in that it comprises the steps of:

(a) reacting an unsaturated polar monomer having a functional group releasing a proton or a salt of the unsaturated polar monomer, with a masking agent comprising an organometallic compound of the general formula (I) capable of masking the functional group to form a corresponding masked monomer;

$$R_n—M—X_m \qquad (I)$$

wherein M is a metal selected from the group consisting of Li, Mg, Ca, Sc, Ti, V, Cr, Fe, Ni, Cu, Zn, Co, Al, Si, Y, Zr, Rh, Pd, In, Sn, Sm, and Hf; R is a ligand represented by a compound or an ionic moiety thereof selected from the group consisting of an unsaturated cyclic hydrocarbon, an unsaturated cyclic hydrocarbon having hydroxyl group, an unsaturated heterocyclic hydrocarbon and an unsaturated heterocyclic hydrocarbon having hydroxyl group; X represents a halogen atom; n is an integer of 1 to 5; m is an integer of 1 to 3; "n+m" is an integer of 2 to 6;

further wherein R may be the same or different when n is an integer of 2 to 5; and (b) polymerizing the masked monomer either alone or in combination with another monomer in the presence of the coordination polymerization catalyst to obtain the polymer.

The second embodiment of the method for producing a polymer by coordination polymerization according to this invention is characterized in that it comprises the steps of:

(a) reacting an unsaturated polar monomer having a functional group releasing a proton or a salt of the unsaturated polar monomer, with a masking agent comprising an organometallic compound of the general formula (II) capable of masking the functional group to form a corresponding masked monomer;

(II)

wherein $R^1$ is a monovalent organic group having 1–6 carbons and $R^2$ is a group selected from an unsaturated heterocyclic hydrocarbyl group and a phenyl group substituted with one or more organic groups having 1 or more carbons wherein the substitution at least takes place at the 2- or the 6-position of phenyl ring; and (b) polymerizing the masked monomer either alone or in combination with another monomer in the presence of the coordination polymerization catalyst to obtain the polymer.

The first and second embodiments of the method for producing a polymer of the invention may further comprise the step of removing the masking agent from the polymer after the step of obtaining the polymer by the use of the coordination polymerization catalyst.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
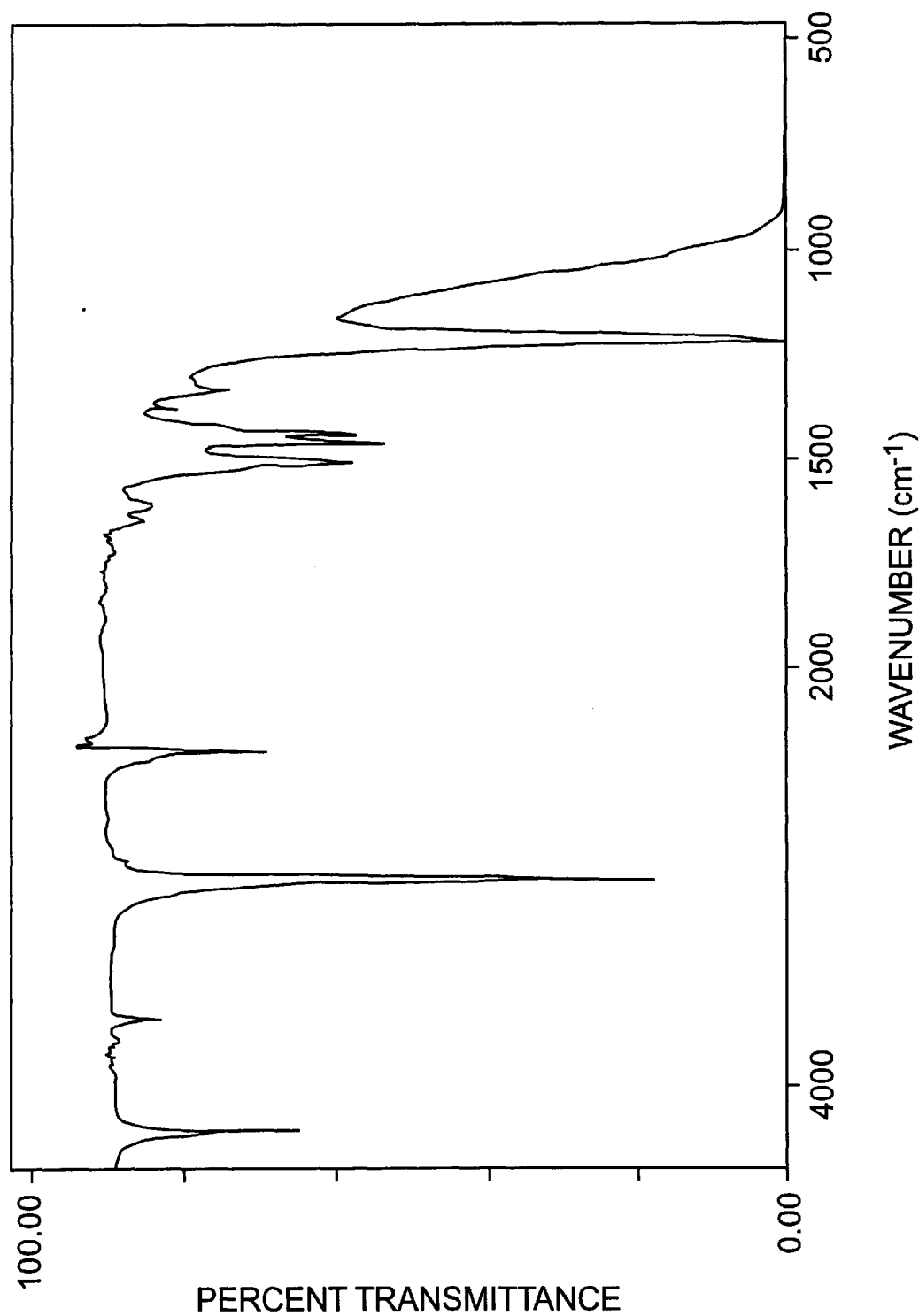
FIG. 1 is the infrared absorption spectrum of a masked monomer obtained by masking methacrylic acid with bis (cyclopentadienyl)titanium chloride.

The method for producing a polymer by coordination polymerization according to this invention comprises the steps of:

reacting an unsaturated polar monomer having a functional group releasing a proton (hereinafter referred to as "protic monomer") or a salt of the protic monomer, with a masking agent comprising the organometallic compound having above-described general formula (I) or (II), that is capable of masking the functional group, to form a corresponding masked monomer; and polymerizing the masked monomer either alone or in combination with another monomer in the presence of the coordination polymerization catalyst to obtain the polymer.

In this invention, the term "coordination polymerization" means a polymerization mode in which a monomer is polymerized with its unsaturated bond part being coordinated to a catalyst. The reactive species at polymer-propagating points in the polymerization reaction are non-limiting. They are, for example, radicals, anions or cations. The term "coordination polymerization catalyst" means a catalyst capable of coordination polymerization; a metal compound is ordinarily used as such coordination polymerization catalyst.

Although Applicants do not wish to be bound to any theories, they believe that in order for the polymerization to proceed through coordination polymerization, the unsaturated bond part of the monomer must be coordinated with the metal of the coordination polymerization catalyst. However, a strongly nucleophilic monomer such as the protic monomer lowers the reactivity of the coordination polymerization catalyst and will not let the coordination polymerization to proceed. This is because the nucleophilic part of the protic monomer is coordinated to the metal of the coordination polymerization catalyst and thus, the unsaturated bond part of the monomer can no longer be coordinated to the coordination polymerization catalyst.

In contrast with this, according to this invention, the coordination polymerization is feasible since the protic monomer, that lowers the reactivity of a coordination polymerization catalyst, has been masked with a masking agent comprising the organometallic compound having above-described general formula (I) or (II) prior to polymerization.

In addition, by using one of these organometallic compounds, reaction speed between a protic monomer and the masking agent can be improved when comparing with the masking agent disclosed in U.S. Pat. No. 5,153,282. It is believed that the reaction speed improvement by use of the masking agent comprising the organometallic compound of the general formula (I) or (II) is due to the existence of a halogen atom and/or an oxygen atom. That is, the electronegativity of these atoms in the organometallic compound can facilitate the reaction between a protic monomer and the masking agent.

Masking Agent

The masking agent used for masking the protic monomers comprises at least one organometallic compound represented by the following general formula (I) or (II):

First, the organometallic compound of the general formula (I) (hereinafter referred to as "compound I") is explained. In the formula (I), M is a metal selected from the group consisting of Li, Mg, Ca, Sc, Ti, V, Cr, Fe, Ni, Cu, Zn, Co, Al, Si, Y, Zr, Rh, Pd, In, Sn, Sm, and Hf. Among these, Ti, Zr, Hf, V, and Al are preferred, because these metals have relatively low electronegativity and form a strong bond with the protic monomers. As a metal for the compound I, Ti and Al are especially preferred because of high reactivity with the protic monomers.

In the formula (I), R is a ligand represented by a compound or an ionic moiety thereof selected from the group consisting of an unsaturated cyclic hydrocarbon, an unsaturated cyclic hydrocarbon having hydroxyl group, an unsaturated heterocyclic hydrocarbon and an unsaturated heterocyclic hydrocarbon having hydroxyl group. When the compound I contains 2 or more ligands, each ligand may be the same or different.

Unsaturated cyclic hydrocarbons include both unsaturated monocyclic hydrocarbons and unsaturated polycyclic hydrocarbons. Examples of unsaturated monocyclic hydrocarbons are cyclopropene, cyclobutene, cyclobutadiene, cyclopentene, cyclopentadiene, cyclohexene, cyclohexadiene, benzene, cycloheptatriene, cyclooctadiene, cyclooctatetraene, cyclododecatriene and a substitution product of the foregoing.

Examples of unsaturated polycyclic hydrocarbons include unsaturated condensed polycyclic hydrocarbon such as indene, nephthalene, fluorene, phenanthrene, and anthracene and non-condensed polycyclic haydrocarbon such as terphenyl. The number of carbon atom in the unsaturated cyclic hydrocarbon is preferably 3 to 20, more preferably 3 to 12, and most preferably 5 to 10.

Unsaturated cyclic hydrocarbons having hydroxyl group, that can be used as a ligand, are the unsaturated cyclic hydrocarbons containing one or more hydroxyl groups. Such materials include cyclohexeneol, phenol, alkylphenol, naphthol, anthrathenol, and m-terphenyl-2'-ol.

Unsaturated heterocyclic hydrocarbons include both unsaturated heteromonocyclic hydrocarbons and unsaturated heteropolycyclic hydrocarbons. Examples of unsaturated heteromonocyclic hydrocarbons are furan, pyrrole, pyridine and imidazoline.

Examples of unsaturated heteropolycyclic hydrocarbons are indole, quinoline and carbazole. The number of carbon atom in the unsaturated heterocyclic hydrocarbon is preferably 3 to 20, more preferably 3 to 12, and most preferably 5 to 10.

Unsaturated heterocyclic hydrocarbons having hydroxyl group, that can be used as a ligand, is the unsaturated heterocyclic hydrocarbon containing one or more hydroxyl groups. Such materials include hydroxypyridine, indolol and quinolinol.

In the present invention, the term "ionic moiety" means anionic moiety or cationic moiety of the compound described above, which can be a ligand for the metal of the organometalic compound. For example, anionic moiety of cyclopentadiene ($C_5H_6$) is cyclopentadienyl anion ($C_5H_5^-$) having a structure obtainable by removing an $H^+$ from cyclopentadiene. The moieties obtained by removing an $H^+$ from unsaturated cyclic hydrocarbons having hydroxyl group and unsaturated heterocyclic hydrocarbons having hydroxyl group are also anionic moieties. Such anionic moieties include alkylphenyloxy group having a structure obtainable by removing an $H^+$ from —OH group of alkylphenol, and quinolinyloxy group having a structure obtainable by removing an $H^+$ from —OH group of quinolinol. On the other hand, a cationic moiety includes cycloheptatriene cation ($C_7H_7^+$) that has a structure obtainable by removing an $H^-$ from cycloheptatriene ($C_7H_8$).

In the present invention, the ligand "R" is preferably a bulky ligand because the reaction product between the organometallic compound and the protic monomer, viz. the masked monomer, is provided with high stability.

The bulkiness of a ligand can be evaluated in terms of its solid angle, for example. If the ligand of an organometallic compound has a solid angle of 2.5 steradian or greater, it is bulky enough to be preferably of use in this invention. For example, the solid angle of cyclopentadiene, an unsaturated cyclic hydrocarbon, is 3.6 steradian. Therefore, cyclopentadiene is sufficiently bulky to be used in accordance with the invention. If the solid angle of a ligand is less than 2.5 steradian, the reaction product between an organometallic compound having such a ligand and the protic monomer, viz. the masked monomer, has a tendency to be unstable.

The compound I contains a halogen atom such as Cl, Br and I, that is bonded to the metal in the compound I. When the compound I contains 2 or 3 halogen atoms, each halogen atom may be the same or different. Although a kind of a halogen atom is not particularly limited, Cl is preferred because of a reactivity.

In the formula (I), n denotes a number of a ligand and m denotes a number of a halogen atom n can be an integer of from 1 to 5 and m can be an integer of from 1 to 3. However, a sum of n and m must be an integer of from 2 to 6. Preferred number for n and m are determined according to a type of the metal in the compound I. For example, when the metal in the compound I is Ti or Al, n is preferably 2 or 4 and m is preferably 1.

In the present invention, when the metal in the compound I is Ti, the ligand "R" is preferably unsaturated cyclic hydrocarbon having 3 to 20 carbons or an ionic moiety thereof. In this case, the ligand R is more preferably cyclopentadienyl anion. Therefore, bis(cyclopentadienyl)titanium halide is preferred as the compound I, and bis(cyclopentadienyl)titanium chloride of the following formula (1) is especially preferred.

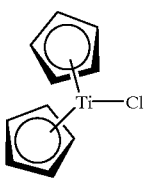

(1)

In the present invention, when the metal in the compound I is Al, the ligand R is preferably unsaturated heterocyclic hydrocarbon having hydroxyl group or an ionic moiety thereof. In this case, the ligand "R" is more preferably is quinolinyloxy group such as 8-quinolinyloxy group of the following formula (2a) or alkyl quinolinyloxy group such as 2-methyl-8-quinolinyloxy group of the following formula (2b). Alkyl group in alkyl quinolinyloxy group preferably has 1 to 6 carbons, more preferably 1 to 3 carbons.

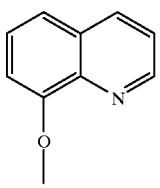

(2a)

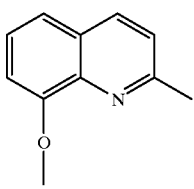

(2b)

In the present invention, when the metal is Al, the compound I is preferably bis(methylquinolinolate) aluminum halide, more preferably bis(2-methyl-8-quinolinolate) aluminum chloride of the following formula (3).

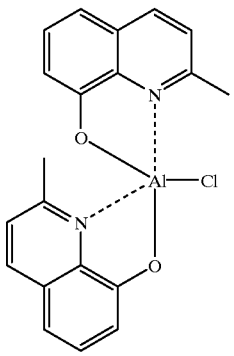

(3)

Next, the organometallic compound of the general formula (II) (hereinafter referred to as "compound II+) is explained. In the formula (II), $R^1$ is a monovalent organic group having 1–6 carbons. In the present invention, $R^1$ is preferably a monovalent organic group having 1–3 carbons and more preferably methyl group.

In the formula (II), $R^2$ is a group selected from an unsaturated heterocyclic hydrocarbyl group and a phenyl group substituted with one or more organic groups having 1 or more carbons wherein the substitution at least takes place at the 2- or the 6-position of phenyl ring. Hereinafter, the latter group is referred to as a "substituted phenyl group."

An unsaturated heterocyclic hydrocarbyl group includes both an unsaturated heteromonocyclic hydrocarbyl group and an unsaturated heteropolycyclic hydrocarbyl group. Examples of an unsaturated heteromonocyclic hydrocarbyl group are furanyl group, pyrrolyl group, pyridinyl group and imidazolinyl group.

Examples of an unsaturated heteropolycyclic hydrocarbyl group are indolyl group, quinolinyl group and carbazolyl group. The number of carbon atom in the unsaturated heterocyclic hydrocarbyl group is preferably 3 to 20, more preferably 3 to 12, and most preferably 5 to 10.

As a heteropolycyclic hydrocarbyl group, quinolinyl group such as 8-quinolinyl group of the following formula (4a) or alkyl quinolinyl group such as methylquinolinyl group including 2-methyl-8-quinolinyl group of the following formula (4b) is preferred. Alkyl group in alkyl quinolinyl group preferably has 1 to 6 carbons, more preferably 1 to 3 carbons.

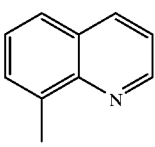

(4a)

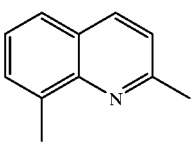

(4b)

In the present invention, when $R^2$ is an unsaturated heterocyclic hydrocarbyl group, the compound II is preferably bis(methylquinolinolate) methyl aluminum, more preferably bis(2-methyl-8-quinolinolate) methyl aluminum of the following formula (5).

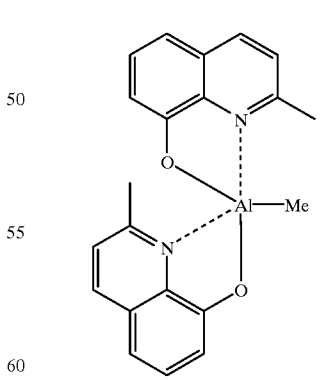

(5)

When $R^2$ is the substituted phenyl group, the organic group in the substituted phenyl group preferably has 2–12 carbons, more preferably 2–6 carbons, and most preferably 3–4 carbons. And, the substituted phenyl group is preferably a group of the general formula (III)

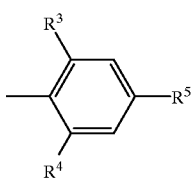

(III)

wherein $R^3$ and $R^4$ may be the same or different and each represents a monovalent organic group having 1–6 carbons and $R^5$ is a hydrogen atom or a monovalent organic group having 1–3 carbons. In the general formula (III), $R^3$ and $R^4$ are both preferably t-butyl group.

In the present invention, when $R^2$ is the substituted phenyl group, the compound II is preferably methylaluminum-2,6-di-t-butyl-4-methylphenoxide of the following formula (6).

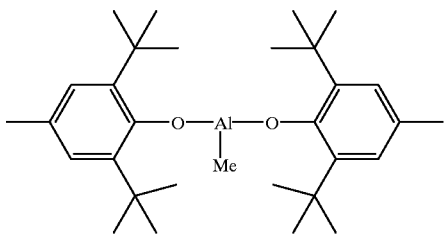

(6)

Unsaturated Polar Monomer

Above-described masking agent is used for masking a monomer that lowers the reactivity of the coordination polymerization catalyst. Such monomers include an unsaturated polar monomer having a functional group releasing a proton (a protic monomer) and a salt of the protic monomer. When the proton of the protic monomer or cation of the salt of the protic monomer is removed, the functional group in the monomer has acquired an anionic nature. This anionic functional group undergoes a nucleophilic attack on the coordination polymerization catalyst. Then, the catalyst is inactivated.

The protic monomer used in the present invention is preferably an unsaturated polar monomer having a pKa value (the logarithmic value of the reciprocal of acid dissociation constant) of 40 or lower. This is because there is concern if the pKa value is higher than 40, the proton of an unsaturated part of the protic monomer, not the very proton of the functional group capable of releasing a proton, may be replaced with the metal of the organometallic compound.

The protic monomer preferably contains at least one ethylenical unsaturation (C—C double bond) and at least one functional group such as carboxyl group (—COOH), borate group (—OB(OH)$_2$), boronic acid group (—B(OH)$_2$) phosphate group (—OPO(OH)$_2$), phosphonic acid group (—PO(OH)$_2$), phosphinic acid group (=PO(OH)), sulfone group (—SO$_3$H), hydroxyl group (—OH), amide group (—CO—NHR or —CO—NH—, wherein R is H or a hydrocarbon group), imino group (=NH or —CH=N—), imide group (—NH—), amino group (—NH$_2$), cyclopentadienyl group, sulfonamide group (—SO$_2$NH—R, wherein R is H or a hydrocarbon group) or sulfonimide group (—SO$_2$NHSO$_2$—).

In the present invention, it is especially preferred to use the protic monomer having carboxyl group such as alkenoic acid, alkenepolycarboxylic acid and (meth)acrylic acid and to use the protic monomer having hydroxyl group such as alkenol. The protic monomer exemplified above can be used alone or in combination of two or more.

Masked Monomer

By the reaction of the protic monomer and the masking agent comprising the organometallic compound of the general formula (1) or (2), a masked monomer is obtained. The masked monomer obtained from the protic monomer and the organometallic compound is typically an ionic complex of an anion of the protic monomer (or a salt of the protic monomer) and a cation of the organometallic compound.

For example, the masked monomer obtained from bis (cyclopentadienyl)titanium chloride of the formula (1) and sodium methacrylate is an inonic complex of the following formula (7).

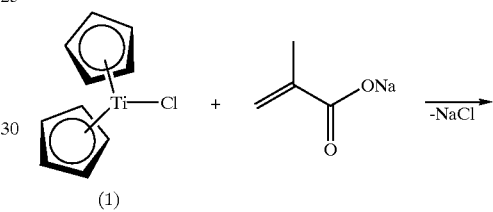

(1)

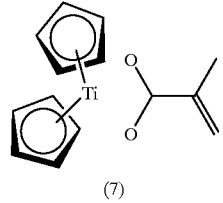

(7)

The masked monomer obtained from bis(2-methyl-8-quinolinolate) aluminum chloride of the formula (3) and sodium 5-hexenoate is an ionic complex of the following formula (8).

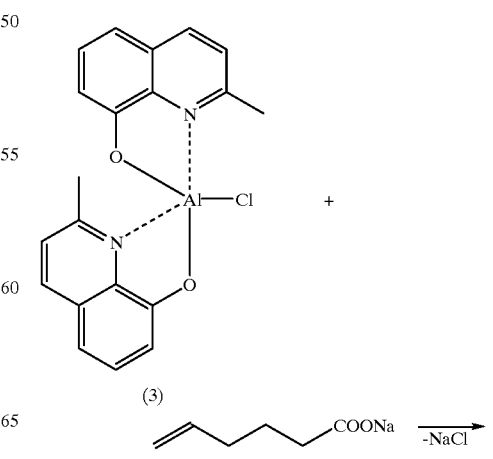

(3)

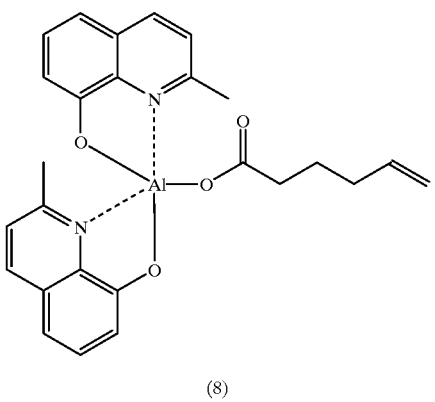

(8)

The masked monomer obtained from bis(2-methyl-8-quinolinolate) methyl aluminum of the formula (5) and 5-hexenoic acid is an ionic complex of the following formula (9).

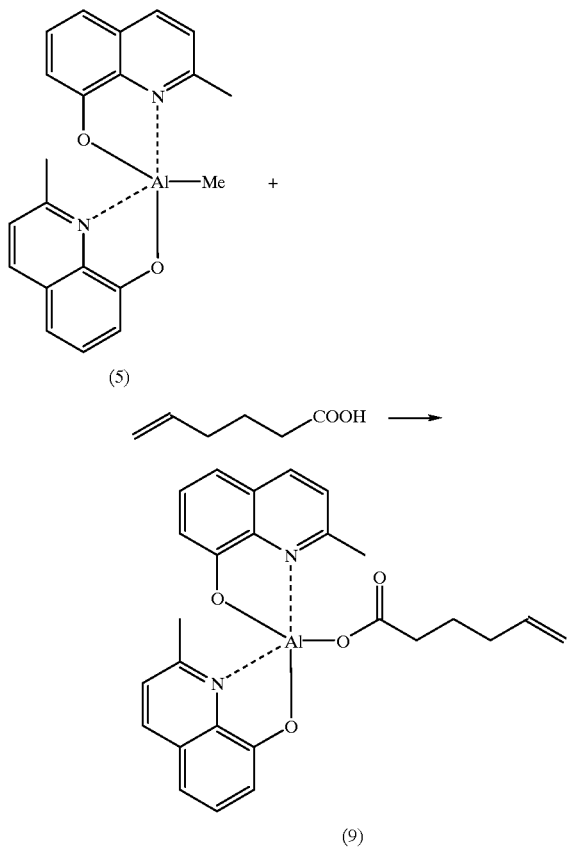

(5)

(9)

The masked monomer obtained from methylaluminum -2,6-di-t-butyl-4-methylphenoxide of the formula (6) and 5-hexenoic acid is an ionic complex of the following formula (10).

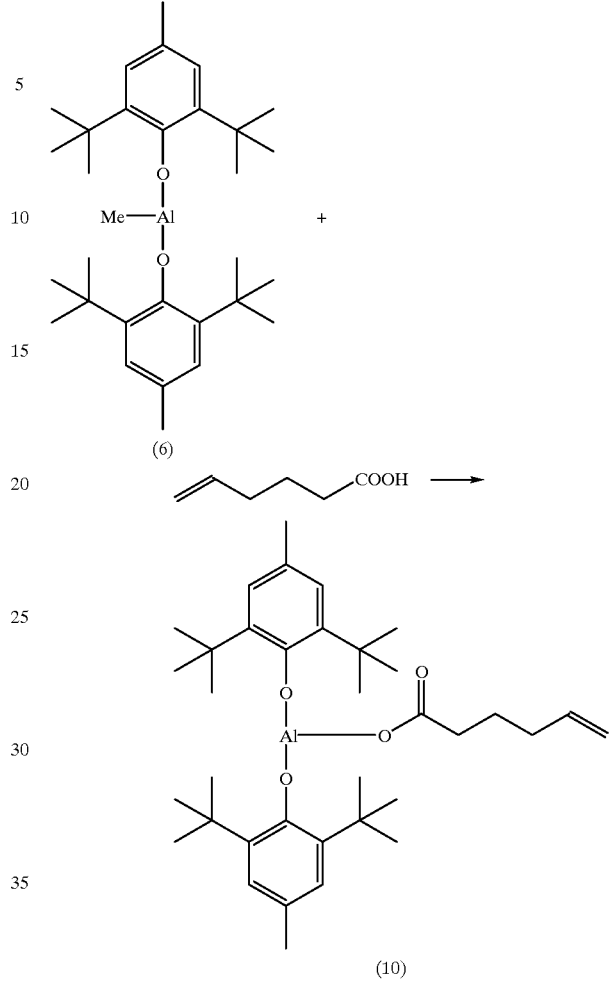

(6)

(10)

Masked Monomer Formation

The reaction conditions for obtaining the masked monomer are not particularly limited and are appropriately chosen depending on the masking agent to be used and the kind of the protic monomer. For example, when a monomer such as sodium methacrylate, which has low solubility in an organic solvent but high solubility in water, is used as the protic monomer, the masking agent for use is preferably water-soluble as well. When water is used as solvent, the masking agent and the monomer are reacted, for example, in an inert gas atmosphere from −70° C. to 200 ° C. to obtain the masked monomer.

On the other hand, when a monomer such as alkenol, which has low solubility in water but high solubility in an organic solvent, is used as the protic monomer, the masking agent for use is preferably soluble in the organic solvent as well. When the organic solvent is used as solvent, the masking agent and the protic monomer are reacted, for example, in an inert gas atmosphere from −70° C. to 200° C. to obtain the masked monomer.

After the reaction between the protic monomer and the masking agent, the masked monomer may be isolated by removal of the solvent used, or the solvent may not be removed. When the solvent is not removed, the coordination polymerization catalyst can be added to initiate polymerization. If the solvent used to obtain the masked monomer is highly polar, the coordination polymerization usually does not proceed. Thus, the solvent is preferably replaced by a solvent of low polarity before the polymerization reaction is initiated.

Another Monomer

The masked monomer is able to undergo coordination polymerization either alone or in combination with another monomer in the present invention. For the monomer with which the masked monomer can copolymerize, mentioned as most preferred one is an olefin monomer including ethylene; an α-olefin, such as propylene and butene; a cyclic olefin, such as cyclopentene and norbornene; and a diene, such as butadiene and isoprine. Other preferred monomers include, but are not limited to, a (meth)acrylate ester, and a vinyl compound. Any of the above monomers may be used alone or in combination of two or more monomers thereof.

Polymer Formation

The reaction conditions for polymerizing the masked monomer either alone or in combination with another monomer in the presence of the coordination catalyst are not particularly limited and may be appropriately selected from among known coordination polymerization conditions.

For example, when the masked monomer is copolymerized with a monomer, such as ethylene, which is gaseous at room temperature, a pressure polymerization reaction device connected to a vacuum line is preferably employed to carry out the polymerization. Namely, the pressure polymerization reaction device is filled with an inert gas such as argon or nitrogen. The masked monomer, a solvent having low polarity, such as toluene or heptane, the coordination polymerization catalyst, and optionally additives are introduced under the inert gas. Next, after the inert gas has been removed by means of a vacuum pump or the like, ethylene gas is introduced. The polymerization reaction can then be allowed to proceed, for example, at room temperature while the reaction system is being maintained at atmospheric pressure or at a higher pressure.

The coordination polymerization catalysts that can be used in this invention are metal compounds selected from metals such as Zr, Hf, Ti, Ni, Pd, Fe, Co, Mo, W, Re, Sm, Y, Li, K, Na, Ru, Rh and Al. Cocatalysts may be employed if necessary. Such catalysts include the catalyst combining titanium tetrachloride and triethylaluminum (Ziegler catalyst), the catalyst combining titanium trichloride and triethylaluminum (Natta catalyst), the catalyst comprising Ziegler catalyst supported on magnesium chloride ($MgCl_2$) or the like, a catalyst combining a metallocene compound (e.g., titanocene, zirconocene, hafconocene, or ferrocene) and methylaluminoxane (the reaction product of trimethylaluminum with water) (Kaminsky catalysts), a catalyst combining a metallocene compound and, tris(pentafluorophenyl)boron ($B(C_6F_5)_3$) or the like; catalyst containing an α-diimine nickel complex or an α-diimine-palladium complex (Brookhart catalysts); and the like. Any of the above coordination polymerization catalyst may be employed alone or in combination of two or more coordination polymerization catalysts thereof.

Removal of Masking Agent

In this invention, after a polymer is produced, the masking agent may be removed from the polymer. The masking agent comprising the organometallic compound of the general formula (I) or (II) can be removed, for example, by treating the polymer with a solvent containing a mineral acid, such as hydrochloric acid. Treatment with the solvent containing a mineral acid allows the organometallic compound to be replaced with a proton on the polymer.

Having generally described this invention, a further understanding can be obtained by reference to certain specific examples which are provided herein for purposes of illustration only and are not intended to be limiting unless otherwise specified.

EXAMPLES

Obviously, numerous modifications and variations of the present invention are possible in light of the above teachings. It is therefore to be understood that within the scope of the appended claims, the invention may be practiced otherwise than as specifically described herein.

Example 1

Synthesis of Masked Monomer of Methacrylic Acid

To 32 ml of a 1.0 M titanium trichloride/methylene dichloride solution was added 4.88 g of bis(cyclopentadienyl)magnesium dissolved in 20 ml of THF, and stirred at room temperature for 15 hours. After stirring, it was heated at 80° C. for 2 hours and a reaction product solution was obtained. Solvent was removed from this reaction product solution at reduced pressure, and the resulting product was purified through sublimation to give 4.3 g of bis(cyclopentadienyl)titanium chloride ($Cp_2TiCl$) of the formula (1) exhibiting dark blue color.

Next, an aqueous solution of 298 mg $Cp_2TiCl$ added in 6 ml of water and an aqueous solution of 154 mg sodium methacrylate added in 2 ml of water were mixed. After stirring for 5 minutes the precipitate was filtered, washed with 1 ml of water twice and dried in vacuo to give 310 mg of a green solid. The resulting green solid is referred to as "Ti—MA." FIG. 1 shows the infrared absorption spectrum of Ti—MA. In the spectrum, absorption peaks at 1507.3 $cm^{-1}$, 1459.1 $cm^{-1}$, and 1442.6 $cm^{-1}$ are the absorption characteristics observed when Ti is coordinated to the carbonyl of methacrylic acid. This has indicated that the resulting green solid (Ti—MA) is compound of the formula (7) as shown in the reaction scheme below.

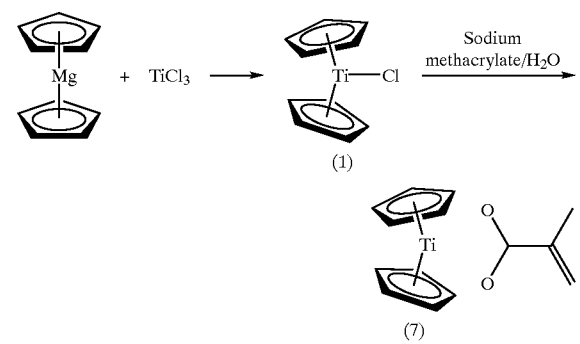

Example 2

Synthesis of Masked Monomer of Acrylic Acid

In a similar manner to Example 1, bis(cyclopentadienyl) titanium chloride ($CP_2TiCl$) was produced. Next, an aqueous solution of 393 mg $Cp_2TiCl$ added in 6 ml of water and an aqueous solution of 173 mg sodium acrylate added in 2 ml of water were mixed. After stirring for 15 minutes, the precipitate was filtered, washed with 5 ml of water once and dried in vacuo to give 235 mg of a green solid. The resulting green solid is referred to as "Ti—AC."

Figure 2:
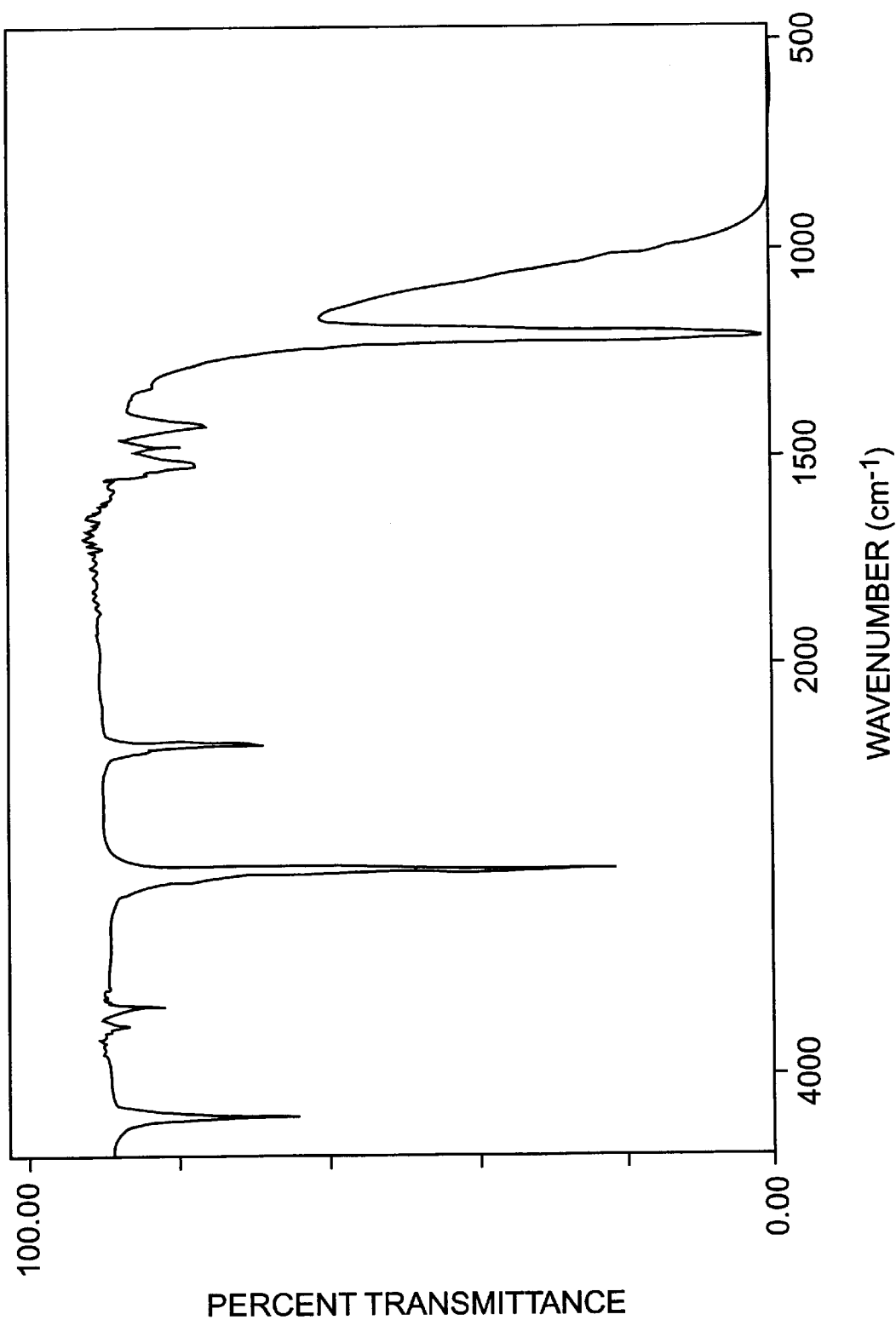
FIG. 2 is the infrared absorption spectrum of a masked monomer obtained by masking acrylic acid with bis (cyclopentadienyl)titanium chloride.

FIG. 2 shows the infrared absorption spectrum of Ti—AC. In the spectrum, absorption peaks at 1524.1 cm$^{-1}$ and 1423.6 cm$^{-1}$ are the absorption characteristics observed when Ti is coordinated to the carbonyl group of acrylic acid. This has indicated that the resulting green solid (Ti—AC) is compound of the formula (11) as shown in the reaction scheme below.

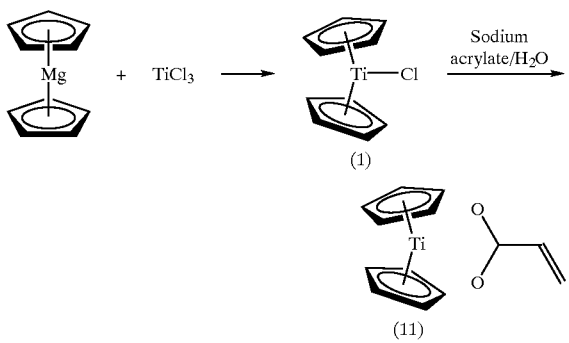

Example 3

Homopolymerization of Ti—MA

Zirconocene catalyst (Cp$_2$ZrMe$_2$) of the formula (12) as shown below, 6 mg, and tris(pentafluorophenyl)boron (B(C$_6$F$_5$)$_3$), 10 mg, were dissolved in 0.5 g of toluene to prepare a catalyst solution.

To a monomer solution of 20 mg Ti—MA dissolved in 7 g of toluene was added the total amount of the previously prepared catalyst solution, and it was stirred at room temperature for 18 hours to give a polymer solution.

Figure 3:
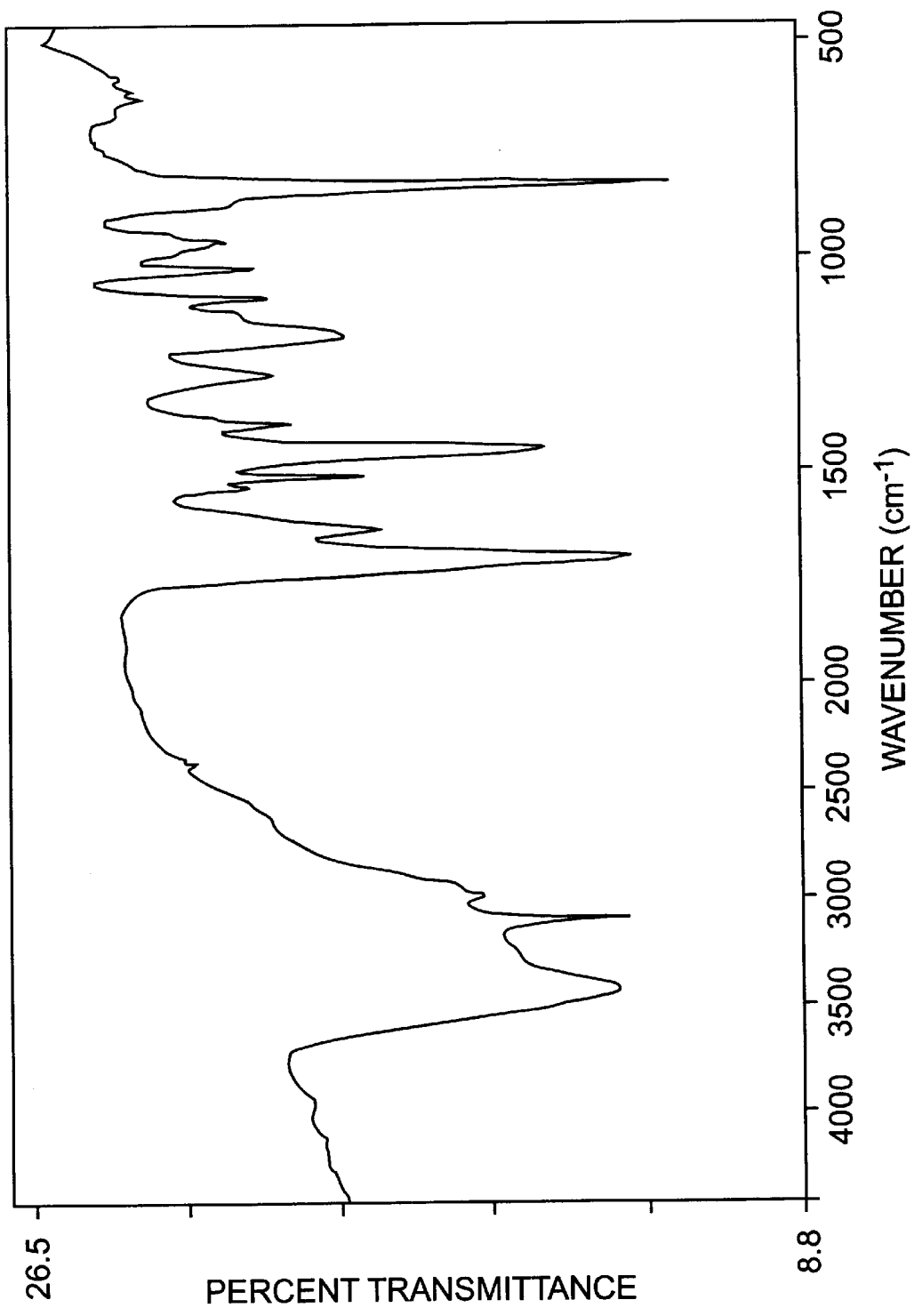
FIG. 3 is the infrared absorption spectrum of a hydrochloric acid treated polymer that was produced by polymerizing the masked monomer obtained by masking methacrylic acid with bis(cyclopentadienyl)titanium chloride.

After stirring was over, ethanol acidified with hydrochloric acid (12 N hydrochloric acid, 10 ml, was added to 50 ml ethanol) was added to the polymer solution and the precipitate was filtered. The filtrate was dried in vacuo to give a light red solid. FIG. 3 shows the infrared absorption spectrum of this solid. The absorption characteristics of this infrared absorption spectrum indicates that the resulting solid is polymethacrylic acid.

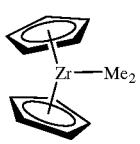

(12)

Example 4

Copolymerization of Ti—MA and Ethylene (1)

Zirconocene catalyst (Cp$_2$ZrMe$_2$) of the formula (12), 20 mg, and tris(pentafluorophenyl)boron (B(C$_6$F$_5$)$_3$), 40 mg, were dissolved in 1 g of toluene to prepare a catalyst solution.

A pressure vessel having a volume of ca. 120 ml was charged with a monomer solution of 80 mg Ti—MA dissolved in 6 g of toluene, to which ethylene was introduced at 5 atm. The contents in the pressure vessel were cooled to −120° C. After the total amount of the previously prepared catalyst solution was added under the above condition, the contents were gradually brought back to room temperature.

Figure 4:
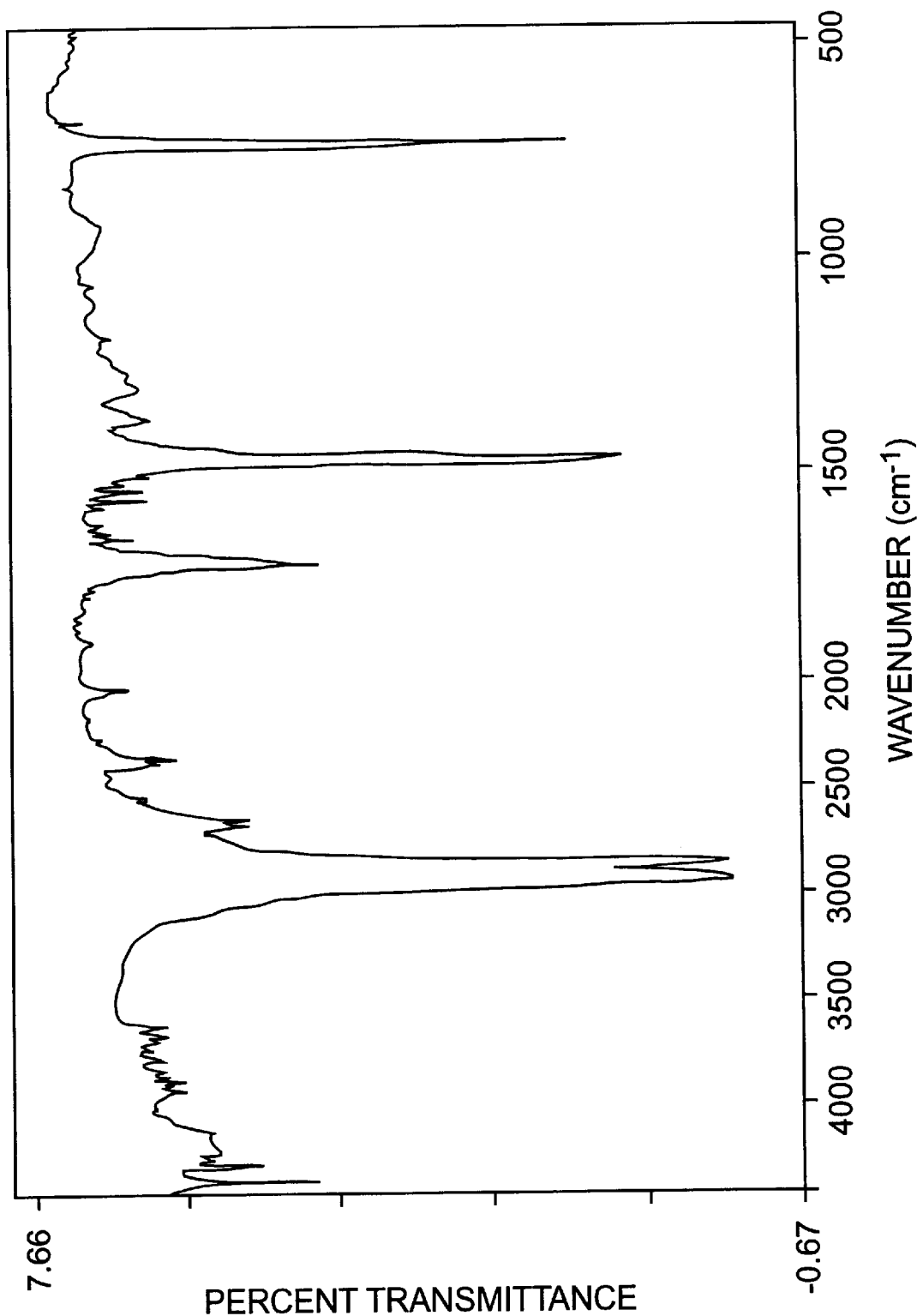
FIG. 4 is the infrared absorption spectrum of a hydrochloric acid treated copolymer that was produced by copolymerizing ethylene and the masked monomer obtained by masking methacrylic acid with bis(cyclopentadienyl) titanium chloride.

The contents in the pressure vessel were stirred at room temperature for 19 hours. Then, 10 ml of toluene was added, and further, ethanol acidified with hydrochloric acid (12 N hydrochloric acid, 10 ml, was added to 50 ml ethanol) was added. After stirring, the precipitate was filtered. The filtered precipitate was washed with ethanol, and then, dried in vacuo to give 461 mg of a white solid. The resulting white solid was shaped into a film by hot pressing, and this film was used to measure an infrared absorption spectrum. FIG. 4 shows this infrared absorption spectrum. This spectrum has indicated that a copolymer of ethylene and methacrylic acid was formed.

In the present example, the molar concentration of the zirconocene catalyst was determined by dividing its molar number by the volume of the total solution, which was 8 mM. The molar concentration of Ti—MA was determined by dividing its molar number by volume of total solution, which was 32 mM.

Example 5

Copolymerization of Ti—MA and Ethylene (2)

Except that the amount of Ti—MA, which was 20 mg, the polymerization was carried out in a manner identical to Example 4, affording 388 mg of solid. The resulting solid was shaped into a film by hot pressing, and this was used to measure an infrared absorption spectrum. The result indicated that the product was a copolymer of ethylene and methacrylic acid.

In the present example, the molar concentration of the zirconocene catalyst was 8 mM and that of Ti—MA was 8 mM,

Example 6

Copolymerization of Ti—MA and Ethylene (3)

Except that the amount of Ti—MA, which was 150 mg and the pressure of the ethylene introduced was set to be 2 atm, the polymerization was carried out in a manner identical to Example 4, affording 367 mg of solid. The resulting solid was shaped into a film by hot pressing, and this film was used to measure an infrared absorption spectrum. The result indicated that the product was a copolymer of ethylene and methacrylic acid.

In the present example, the molar concentration of the zirconocene catalyst was 8 mM and that of Ti—MA was 60 mM.

Example 7

Copolymerization of Ti—AC and Ethylene (1)

Except that 19 mg of Ti—AC was used instead of 80 mg of Ti—MA, the polymerization was carried out in a manner identical to Example 4, affording 466 mg of solid. The resulting solid was shaped into a film by hot pressing, and this film was used to measure an infrared absorption spectrum. The result indicated that the product was a copolymer of ethylene and acrylic acid.

In the present example, the molar concentration of the zirconocene catalyst was 8 mM; and the molar concentration of Ti—AC was determined by dividing its molar number by the volume of the total solution, which was 8 mM.

Example 8

Copolymerization Of Ti—AC and Ethylene (2)

Except that the amount of Ti—AC, which was 76 mg, the polymerization was carried out in a manner identical to Example 7, affording 466 mg of solid. The resulting solid was shaped into a film by hot pressing, and this film was used to measure an infrared absorption spectrum. The result indicated that the product was a copolymer of ethylene and acrylic acid.

In the present example, the molar concentration of the zirconocene catalyst was 8 mM and that of Ti—AC was 32 mM.

Example 9

Copolymerization of Ti—AC and Ethylene (3)

Except that the amount of Ti—AC, which was 76 mg and the pressure of the ethylene introduced was set to be 2 atm, the polymerization was carried out in a manner identical to Example 7, affording 136 mg of solid. The resulting solid was shaped into a film by hot pressing, and this film was used to measure an infrared absorption spectrum. The result indicated that the product was a copolymer of ethylene and acrylic acid.

In the present example, the molar concentration of the zirconocene catalyst was 8 mM and that of Ti—AC was 32 mM.

Comparative Example 1

Homopolymerization of Ethylene

Except that Ti—MA was not used, the polymerization was carried out in a manner identical to Example 4, affording 469 mg of solid. The resulting solid was shaped into a film by hot pressing, and this film was used to measure an infrared absorption spectrum. The result indicated that the product was polyethylene.

Comparative Example 2

Copolymerization of Methyl Methacrylate and Ethylene

Except that an equimolar of methyl methacrylate (MMA) was used instead of Ti—MA, the polymerization was carried out in a manner identical to Example 4, affording 145 mg of solid. The resulting solid was shaped into a film by hot pressing, and this film was used to measure an infrared absorption spectrum. The result indicated that the product was a copolymer of ethylene and methyl methacrylate.

In the present example, the molar concentration of the zirconocene catalyst was determined by dividing its molar number by the volume of the total solution, which was 8 mM. The molar concentration of MMA was determined by dividing its molar number by the volume of the total solution, which was 32 mM.

Comparative Example 3

Copolymerization of Methacrylic Acid and Ethylene

Except that an equimolar of methacrylic acid (MA) was used instead of Ti—MA, the polymerization was carried out in a manner identical to Example 4. However, a copolymer was not obtained. In the present example, the molar concentration of the zirconocene catalyst was determined by dividing its molar number by the volume of the total solution, which was 8 mM. The molar concentration of MA was determined by dividing its molar number by the volume of the total solution, which was 32 mM.

The peak intensity at 1720 $cm^{-1}$ arising from the C=O stretching vibration of each carbonyl was divided by the peak intensity at 720 $cm^{-1}$ arising from the $CH_2$ rocking vibration of polyethylene. The values thus obtained are expressed as "C=O absorption intensity" in Table 1. These results indicate that ethylene and the comonomer (Ti—MA or Ti—AC) have been incorporated into the polymer molecule in all the cases of Example 4–9. However, in Examples 5 and 7 the values of the C=O absorption intensity grow smaller since the amounts of introduction of the comonomer (Ti—MA or Ti—AC) are small.

The weight of any copolymer formed was divided by the weight of the polyethylene produced in Comparative Example 1, and the ratio was multiplied 100-fold. The values, thus, obtained are expressed as "relative yield" in Table 1. The relative yields in Examples 4 –9 turn to be values close to 100. It is, hence, understood that the coordination polymerization was efficiently carried out.

TABLE 1

| | example no. | | | | | | comparative example no. | | |
|---|---|---|---|---|---|---|---|---|---|
| | 4 | 5 | 6 | 7 | 8 | 9 | 1 | 2 | 3 |
| pressure of introduced ethylene (atm) | 5 | 5 | 2 | 5 | 5 | 2 | 5 | 5 | 5 |
| molar concentration of zirconocene catalyst (mM) | 8 | 8 | 8 | 8 | 8 | 8 | 8 | 8 | 8 |
| the kind of monomer copolymerized with ethylene | Ti-MA | Ti-MA | Ti-MA | Ti-AC | Ti-AC | Ti-AC | — | MMA | MA |

TABLE 1-continued

|  | example no. | | | | | | comparative example no. | | |
| --- | --- | --- | --- | --- | --- | --- | --- | --- | --- |
|  | 4 | 5 | 6 | 7 | 8 | 9 | 1 | 2 | 3 |
| molar concentration of monomer copolymerized with ethylene (mM) | 32 | 8 | 60 | 8 | 32 | 32 | — | 32 | 32 |
| weight of copolymer formed (mg) | 461 | 388 | 367 | 466 | 466 | 136 | 469 | 145 | 0 |
| relative yield | 98 | 83 | 78 | 99 | 99 | 82 | 100 | 31 | 0 |
| C = O absorption intensity | 44 | 0–5 | 18 | 0–5 | 40 | 71 | 0 | 43 | 0 |

Example 10

Synthesis of Masked Monomer of Sodium 5-hexenoate 180 mg of sodium 5-hexenoate was dissolved in 10 ml of tetrahydrofuran (THF). To this was added 500 mg of bis(2-methyl-8-quinolinolate) aluminum chloride of the following formula (3) and refluxed at 80° C. for 12 hours to give a reaction product. The inorganic salt produced (NaCl) was removed by filtration. $^1$H-NMR spectrum of the reaction product indicated that the reaction product was compound of the formula (8) as shown in the reaction scheme below.

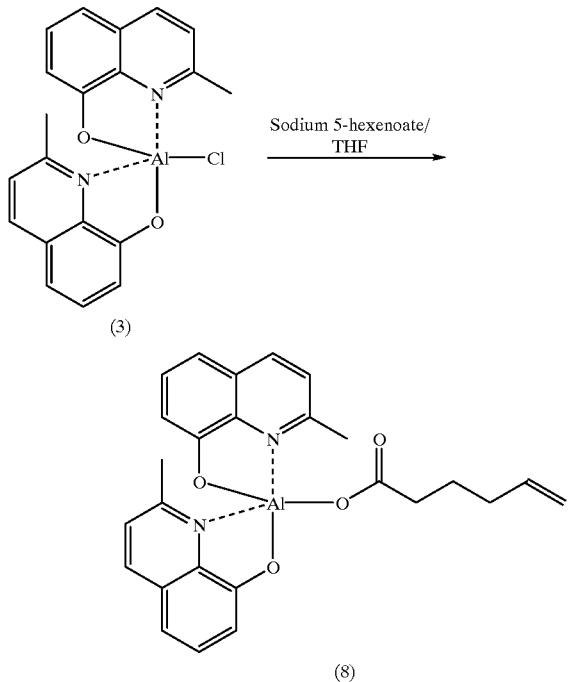

Example 11

Copolymerization of the Masked Monomer of Sodium 5-hexenoate and Ethylene

Under an argon atmosphere, 250 mg of the masked monomer of the formula (8) was dissolved in 15 g of toluene. To this was added 15 mg of Brookhart catalyst of the formula (13) shown below. They were transferred to a 100-ml pressure vessel, to which, while stirring, 2 MPa of ethylene was introduced. At stirring 0.8 g of methylaluminoxane (available from Tosoh-Akzo Co. Ltd.) was added and stirring was continued for 4 hours.

This was allowed to open to the atmosphere, and precipitation was effected by ethanol acidified with hydrochloric acid (12 N hydrochloric acid, 10 ml, was added to 50 ml ethanol). After filtration, the precipitate was washed with ethanol and dried in vacuo to give 250 mg of a reaction product. This reaction product was further refluxed in the ethanol acidified with hydrochloric acid for 1 hour. After filtration, the product was washed with ethanol and dried in vacuo to give the final product.

Figure 5:
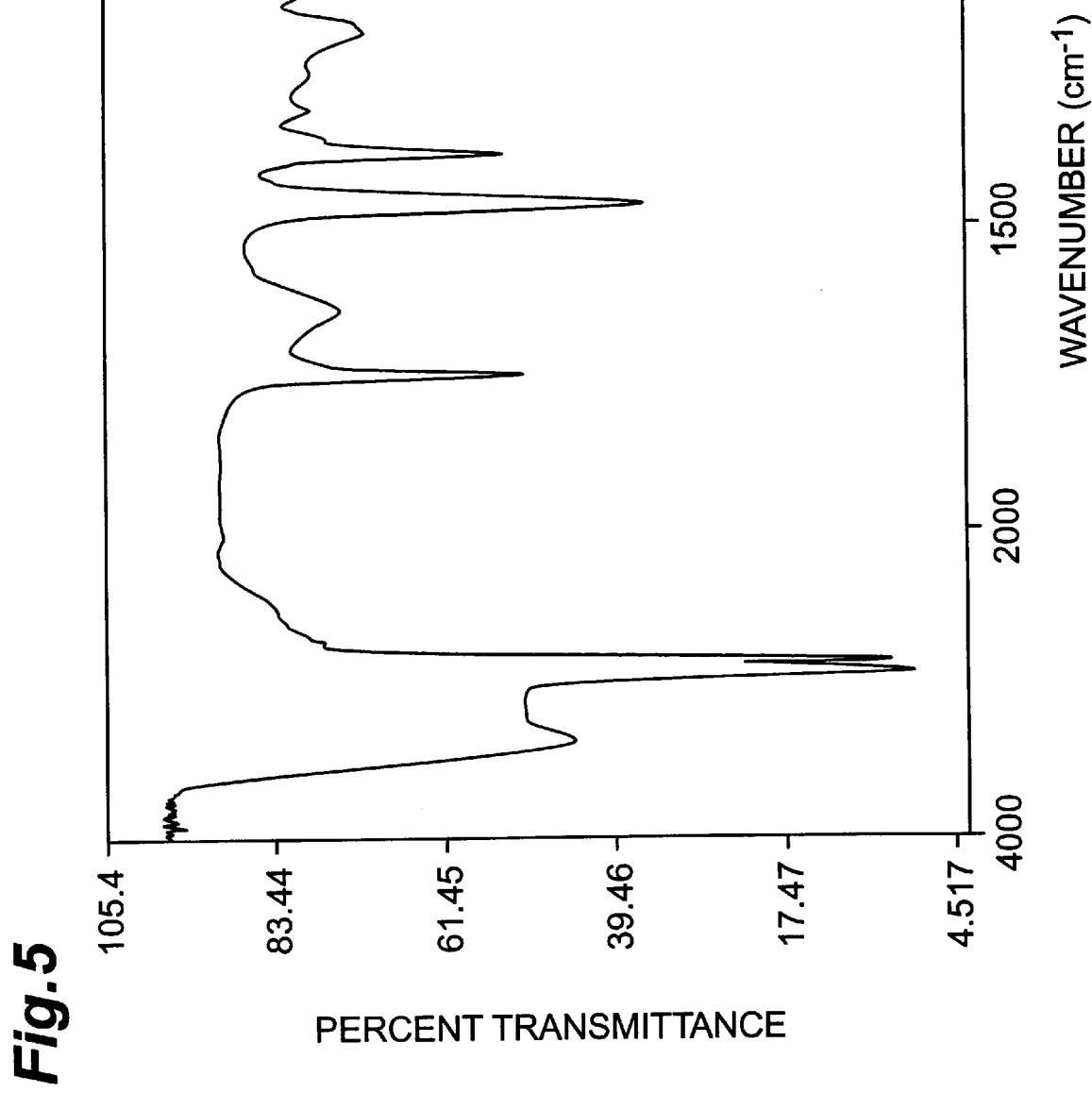
FIG. 5 is the infrared absorption spectrum of a hydrochloric acid treated copolymer that was produced by copolymerizing ethylene and the masked monomer obtained by masking 5-hexenoic acid with bis(2 -methyl-8-quinolinolate) aluminum chloride.
Figure 6:
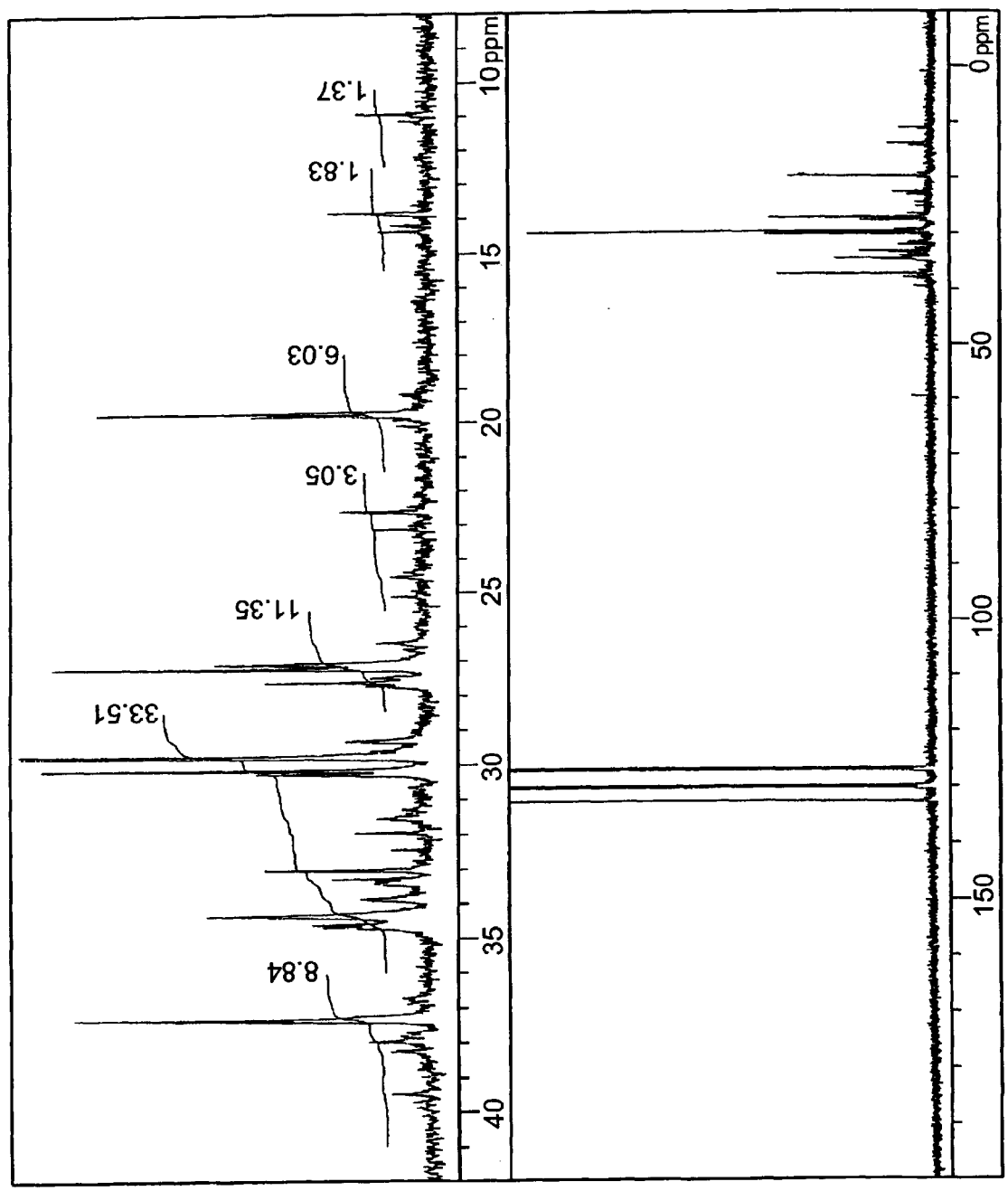
FIG. 6 is the $^{13}$C-NMR spectrum of a hydrochloric acid treated copolymer that was produced by copolymerizing ethylene and the masked monomer obtained by masking 5-hexenoic acid with bis(2-methyl -8-quinolinolate) aluminum chloride.

The infrared absorption spectrum of the final product was measured by the KBr method, and its $^{13}$C-NMR spectrum was measured by dissolving the final product in deuterio-o-dichlorobenzene at 120° C. The infrared absorption spectrum and the $^{13}$C-NMR spectrum are shown in FIGS. 5 and 6, respectively. These results indicated that the final product was an ethylester of a copolymer of ethylene and 5-hexenoic acid and the introduction rate of 5-hexenoic acid into the resultant polymer was 2.5%.

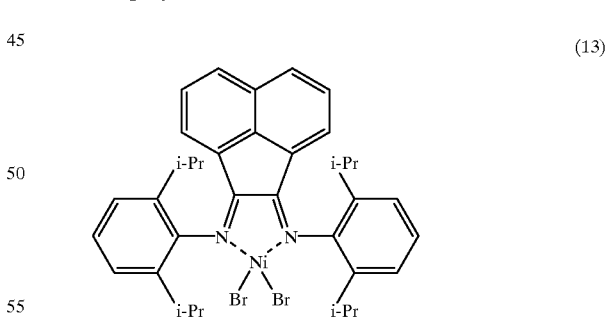

Example 12

Synthesis of Masked Monomer of 5-Hexenoic Acid

Under an argon atmosphere, 13.22 g of 2,6-di-t-butyl-4-methylphenol was dissolved in 25 ml of hexane. To this was added 30 ml of a hexane solution containing 1.0 M trimethylaluminum at room temperature over 15 minutes. After allowing to stand overnight, the precipitated crystal was filtered and washed with hexane. The crystal was dried in vacuo to give 8.5 g of methylaluminum-2,6-di-t-butyl-4-methylphenoxide (MAD) as a white crystal. MAD has the chemical structure represented by the formula (6) shown above.

Figure 7:
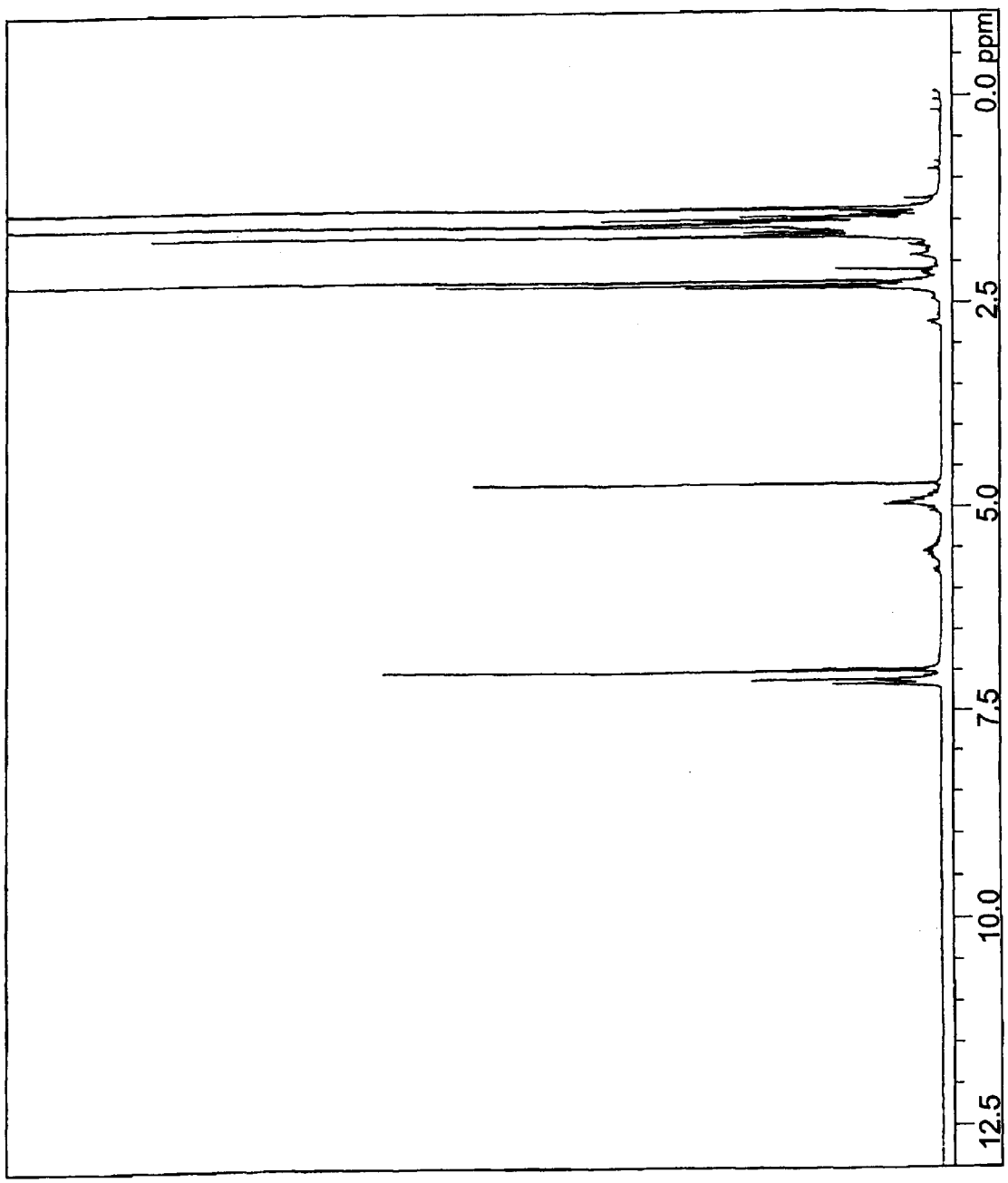
FIG. 7 is the $^1$H-NMR spectrum of a masked monomer obtained by masking 5-hexenoic acid with methylaluminum-2,6-di-t-butyl-4-methylphenoxide.

Under an argon atmosphere, 71 mg of 5-hexenoic acid was dissolved in 1.9 g of toluene. To this was added 307 mg of MAD and stirred for 3 hours to give a reaction product. FIG. 7 shows $^1$H-NMR spectrum of the reaction product, which indicated that the reaction product is a compound of the formula (10) having the structure in which the hydrogen of the carboxyl group of 5-hexanoic acid is replaced with Al of MAD as shown in the reaction scheme below.

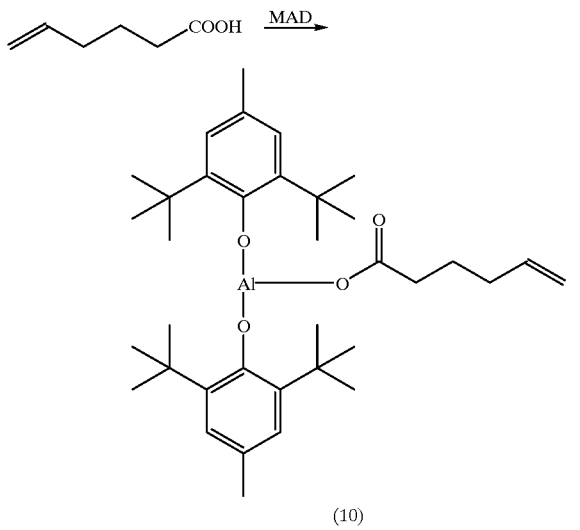

(10)

Example 13

Copolymerization of the Masked Monomer of 5-Hexenoic Acid and Ethylene

Under an argon atmosphere, 71 mg of 5-hexenoic acid was dissolved in 1.9 g of toluene. To this was added 307 mg of MAD and stirred for 3 hours, to which was further added 18.7 mg of Brookhart catalyst of the formula (13) shown above. They were transferred to a 100-ml pressure vessel, to which, while stirring, 2 MPa of ethylene was introduced. At stirring 0.83 g of methylaluminoxane (available from Tosoh-Akzo Co. Ltd.) was added and stirring was continued for 3.5 hours.

This was allowed to open to the atmosphere, and precipitation was effected by ethanol acidified with hydrochloric acid (12 N hydrochloric acid, 10 ml, was added to 50 ml ethanol). After filtration, the precipitate was washed with ethanol and dried in vacuo to give 325 mg of a reaction product. This reaction product was further refluxed in the ethanol acidified with hydrochloric acid for 1 hour. After filtration, the product was washed with ethanol and dried in vacuo to give the final product.

Figure 8:
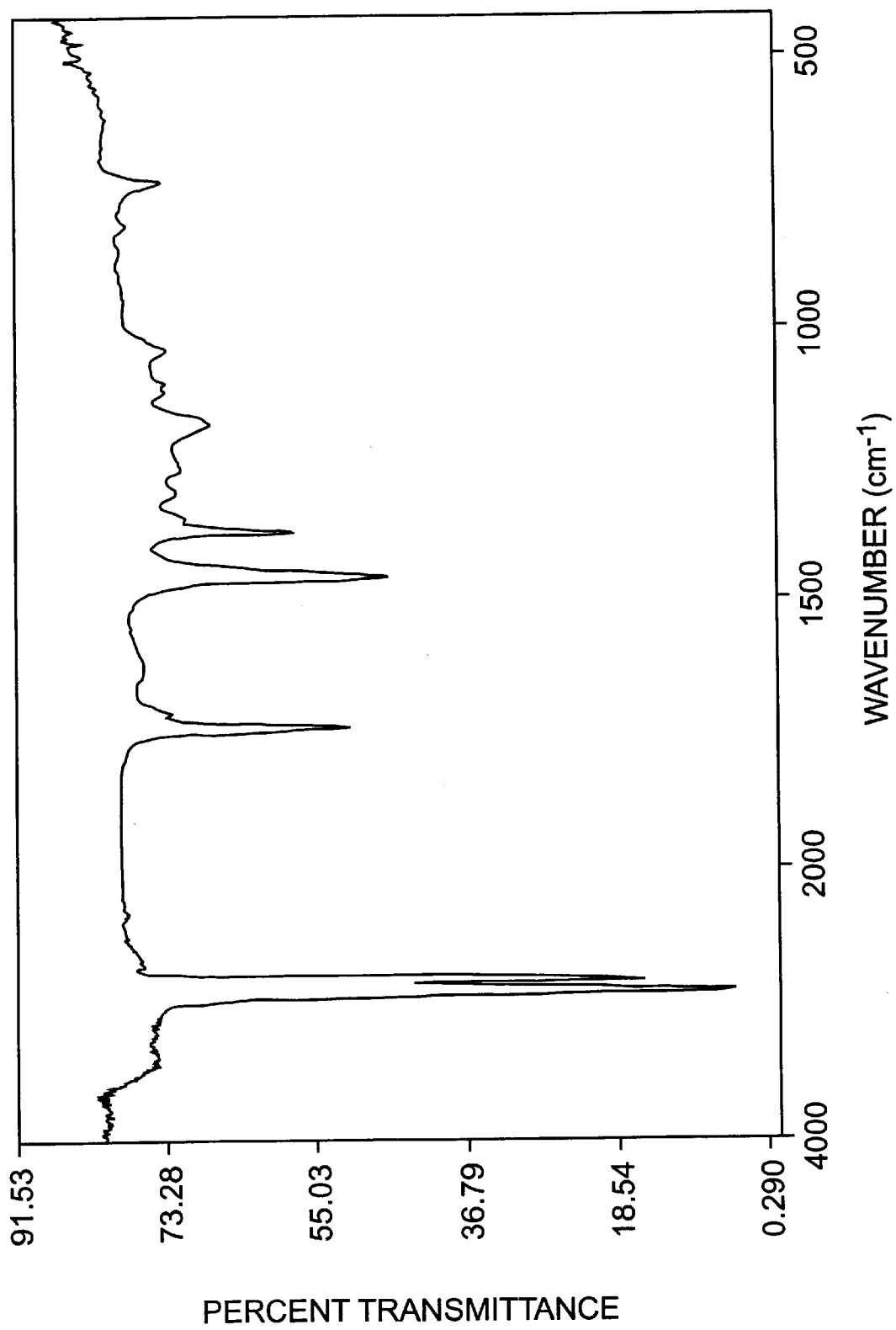
FIG. 8 is the infrared absorption spectrum of a hydrochloric acid treated copolymer that was produced by copolymerizing ethylene and the masked monomer obtained by masking 5-hexenoic acid with methylaluminum-2,6-di-t-butyl-4-methylphenoxide.
Figure 9:
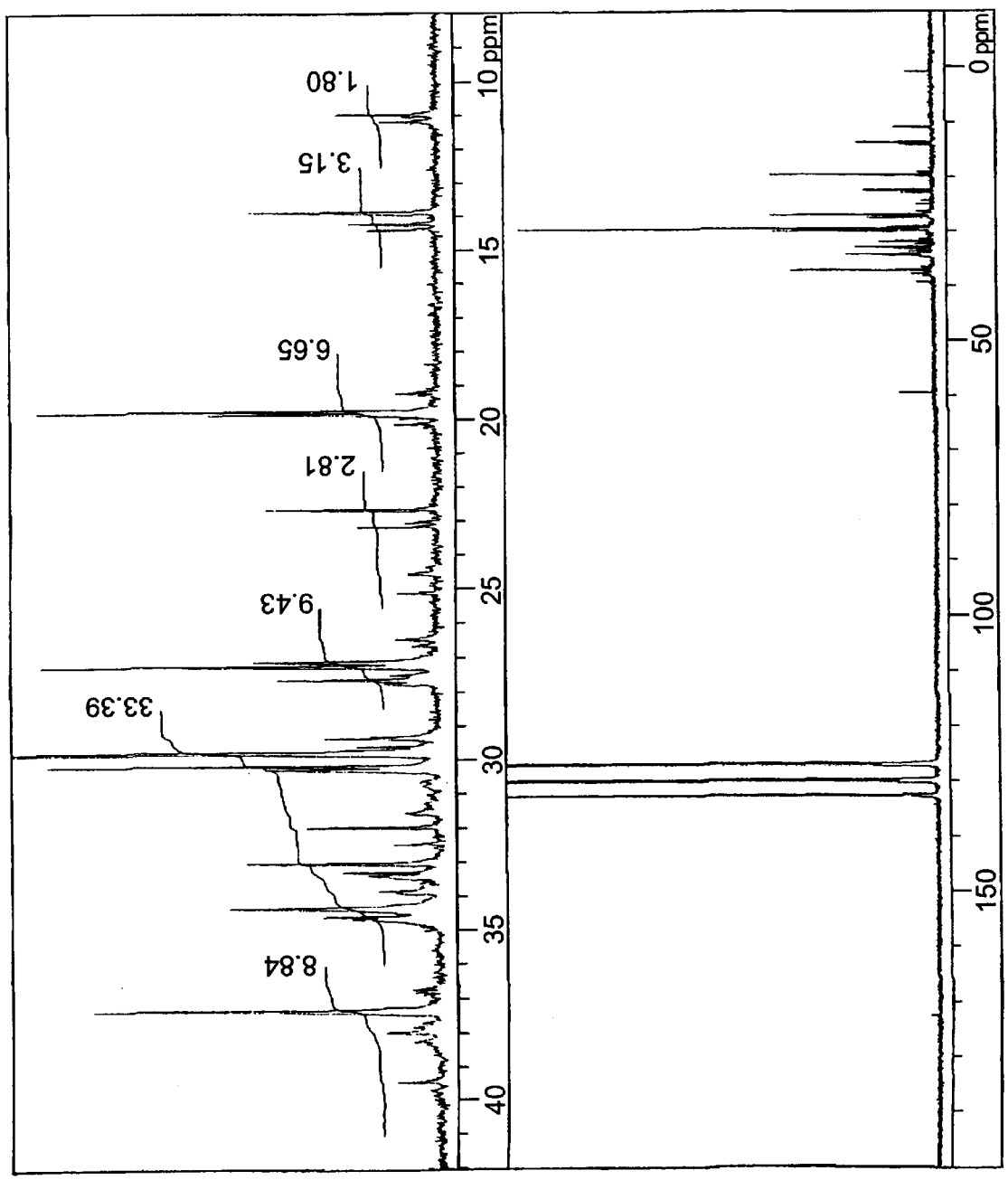
FIG. 9 is the $^{13}$C-NMR spectrum of a hydrochloric acid treated copolymer that was produced by copolymerizing ethylene and the masked monomer obtained by masking 5-hexenoic acid with methylaluminum-2,6-di-t-butyl-4-methylphenoxide.

The infrared absorption spectrum of the final product was measured by the KBr method, and its $^{13}$C-NMR spectrum was measured by dissolving the final product in deuterio-o-dichlorobenzene at 120° C. These infrared absorption spectrum and $^{13}$C-NMR spectrum are shown in FIGS. 8 and 9, respectively. These results indicated that the final product was an ethylester of a copolymer of ethylene and 5-hexenoic acid.

Example 14

Synthesis of Masked Monomer of 4-Penten-1-ol

Figure 10:
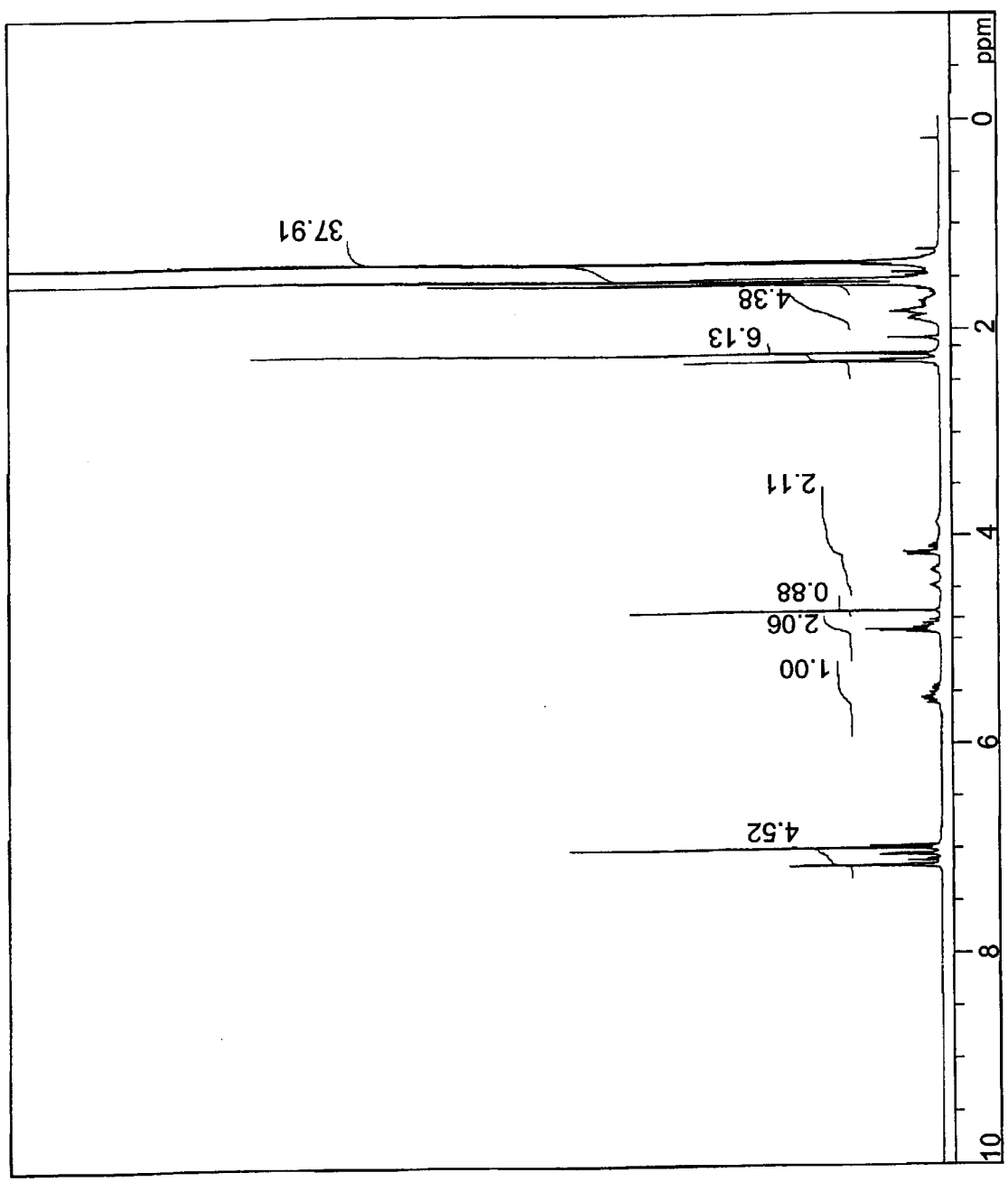
FIG. 10 is the $^1$H-NMR spectrum of a masked monomer obtained by masking 4-penten-1-ol with methylaluminum-2,6-di-t-butyl-4-methylphenoxide.

Under an argon atmosphere, 27 mg of 4-penten-1-ol was dissolved in 1.2 g of toluene. To this was added 153 mg of MAD and stirred for 3 hours, affording the reaction product. FIG. 10 shows $^1$H-NMR spectrum of the reaction product, which indicates that the reaction product is a compound of the formula (14) having the structure in which the hydrogen of the hydroxyl group of 4-penten-1-ol is replaced with Al of MAD as shown in the reaction scheme below.

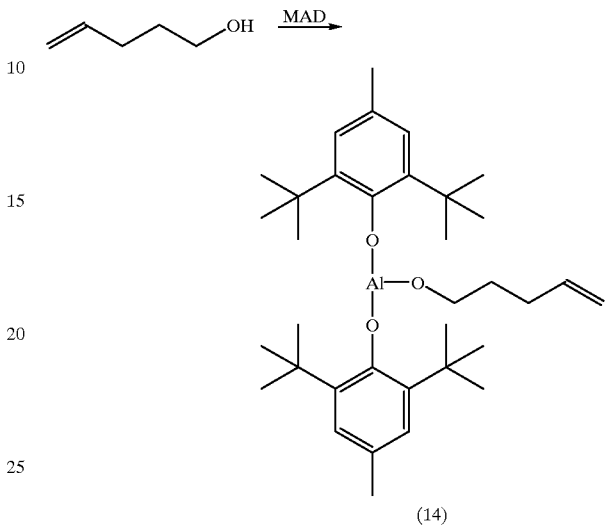

(14)

Example 15

Copolymerization of the Masked Monomer of 4-Penten-1-ol and Ethylene

Under an argon atmosphere, 27 mg of 4-penten-1-ol was dissolved in 1.2 g of toluene. To this was added 153 mg of MAD and stirred for 3 hours, to which was further added 18.7 mg of Brookhart catalyst of the formula (13) shown above. They were transferred to a 100-ml pressure vessel, to which, while stirring, 2 MPa of ethylene was introduced. At stirring 0.83 g of methylaluminoxane (available from Tosoh-Akzo Co. Ltd.) was added and stirring was continued for 3.5 hours. This was allowed to open to the atmosphere, and precipitation was effected by ethanol acidified with hydrochloric acid (12 N hydrochloric acid, 10 ml, was added to 50 ml ethanol). After filtration, the precipitate was washed with ethanol and dried in vacuo to give 325 mg of a reaction product. This reaction product was further refluxed in the ethanol acidified with hydrochloric acid for 1 hour. After filtration, the product was washed with ethanol and dried in vacuo to give 250 mg of the final product.

Figure 11:
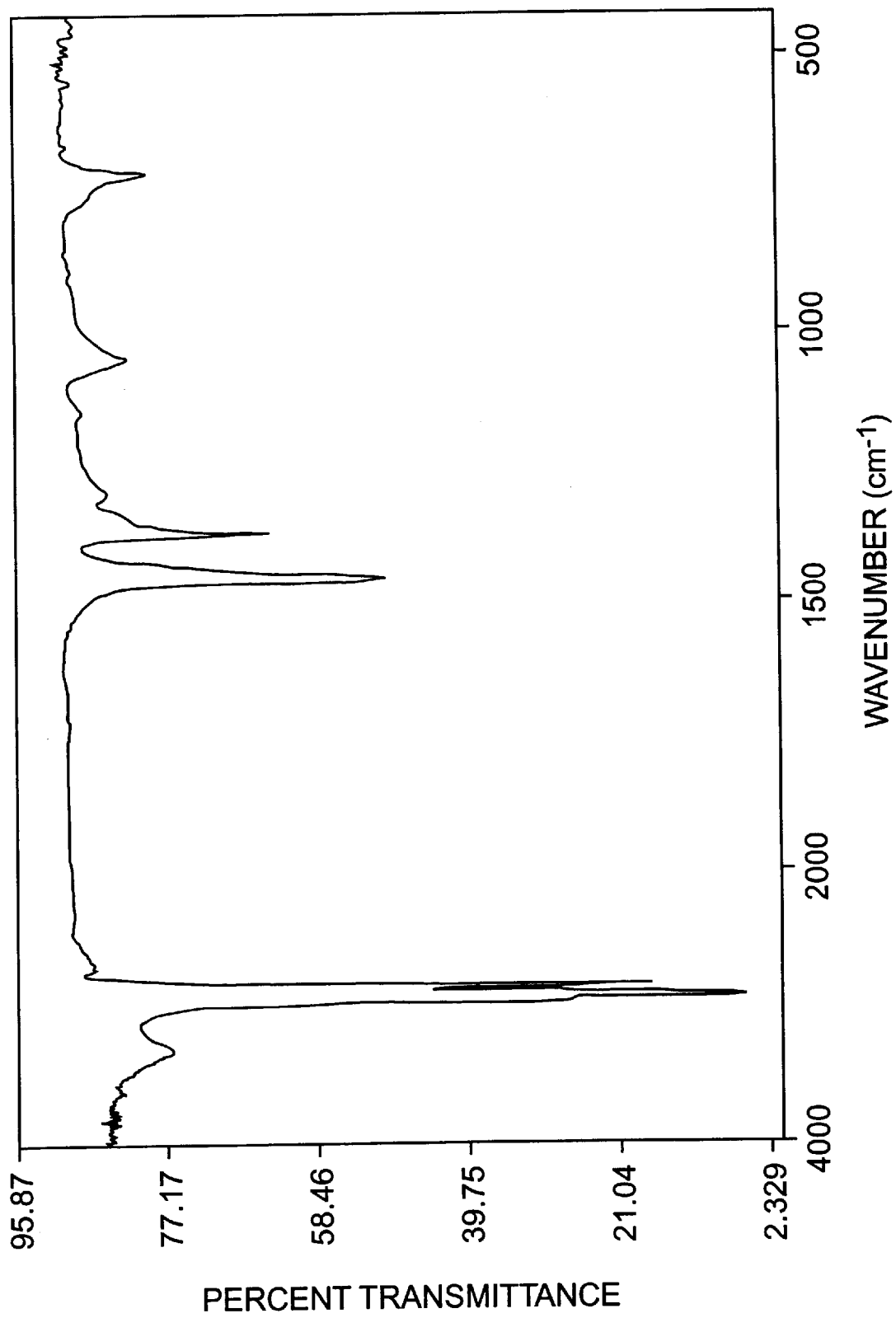
FIG. 11 is the infrared absorption spectrum of a hydrochloric acid treated copolymer that was produced by copolymerizing ethylene and the masked monomer obtained by masking 4-penten-1-ol with methylaluminum-2,6-di-t-butyl-4-methylphenoxide.
Figure 12:
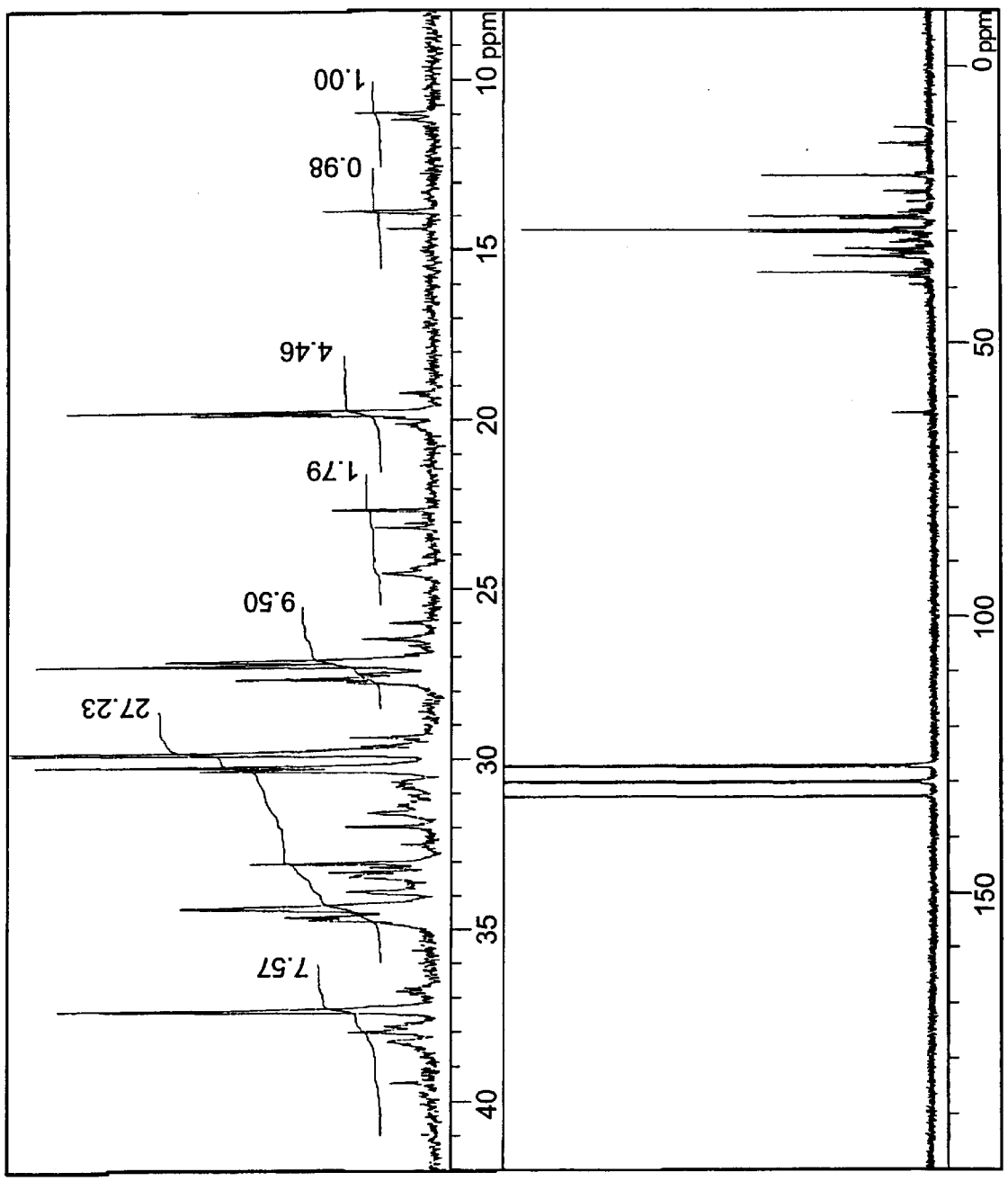
FIG. 12 is the $^{13}$C-NMR spectrum of a hydrochloric acid treated copolymer that was produced by copolymerizing ethylene and the masked monomer obtained by masking 4-penten-1-ol with methylaluminum-2,6-di-t-butyl-4-methylphenoxide.

The infrared absorption spectrum of the final product was measured by the KBr method, and its $^{13}$C-NMR spectrum was measured by dissolving the final product in deuterio-o-dichlorobenzene at 120° C. These infrared absorption spectrum and $^{13}$C-NMR spectrum are shown in FIGS. 11 and 12, respectively. These results indicated that the final product was a copolymer of ethylene and 4-penten-1-ol.

Comparative Example 4

Copolymerization of the Masked Monomer of 5-Hexenoic Acid and Ethylene

Under an argon atomosphere, 5 g of phenol was dissolved in 25 ml of hexane. This was added dropwise to 26.5 ml of a hexane solution containing 1.0 M trimethylaluminum at −20° C. over 1 hour. This was brought to room temperature and allowed to stand overnight. The precipitate was filtered and washed with hexane. Recrystallization from ether gave 4.36 g of methylaluminum diphenoxide.

Under an argon atmosphere, 71 mg of 5-hexenoic acid was dissolved in 2 g of toluene. To this was added 126 mg of methylaluminum diphenoxide and stirred for 3 hours, to which was further added 18 mg of Brookhart catalyst of the formula (13) shown above. They were transferred to a 100-ml pressure vessel, to which, while stirring, 2 MPa of ethylene was introduced. At stirring 0.83 g of methylaluminoxane (available from Tosoh-Akzo Co. Ltd.) was added and stirring was continued for 3 hours.

This was allowed to open to the atmosphere, and precipitation was effected by ethanol acidified with hydrochloric acid (12 N hydrochloric acid, 10 ml, was added to 50 ml ethanol). After filtration, the precipitate was washed with ethanol and dried in vacuo to give 62 mg of a reaction product.

The yield of this comparative example was considerably small when comparing with the yield of example 13 (325 mg), which indicates that the masking agent (methylaluminum diphenoxide) used in this comparative example showed insufficient steric hindrance effect due to a lack of a substituted group at ortho position (the 2- or the 6-position) of phenyl ring of the masking agent.

Comparative Example 5

Copolymerization of the Masked Monomer of 5-Hexenoic Acid and Ethylene

Under an argon atmosphere, 71 mg of 5-hexenoic acid was dissolved in 2 g of toluene. To this was added 0.55 ml of a hexane solution containing 1.0 M trimethylaluminum and stirred for 3 hours, to which was further added 18 mg of Brookhart catalyst of the formula (13) shown above. They were transferred to a 100-ml pressure vessel, to which, while stirring, 2 MPa of ethylene was introduced. At stirring 0.83 g of methylaluminoxane (available from Tosoh-Akzo Co. Ltd.) was added and stirring was continued for 3 hours.

This was allowed to open to the atmosphere, and precipitation was effected by ethanol acidified with hydrochloric acid (12 N hydrochloric acid, 10 ml, was added to 50 ml ethanol). After filtration, the precipitate was washed with ethanol and dried in vacuo to give 62 mg of a reaction product. This reaction product was further refluxed in the ethanol acidified with hydrochloric acid for 1 hour. After filtration, the product was washed with ethanol and dried in vacuo to give 347 mg of the final product.

The infrared absorption spectrum of the final product showed no absorption around 1600–1700 $cm^{-1}$, that is attributed to carboxyl group, which indicates that 5-hexenoic acid was not copolymerized with ethylene. It is believed that the monomer masked with trimethylaluminum reacted with methylaluminoxane, which is a polymerization product of trimethylaluminum, and was fixed at the surface of the methylaluminoxane. This made a reaction speed for copolymer formation slower. Therefore, it can be concluded that MAD which has substituted groups at the 2- and 6-positions (ortho position) works as a masking agent better than trimethylaluminum which is cited in U.S. Pat. No. 5,153,282.

Example 16

Copolymerization of the Masked Monomer of 5-Hexenoic Acid and Ethylene

Under an argon atmosphere, 80 mg of 5-hexenoic acid was dissolved in 3 g of toluene. To this was added 251 mg of bis(2-methyl-8-quinolinolate) methyl aluminum of the formula (5) shown below and mixed for 3 hours. $^1$H-NMR spectrum of the reaction product indicated that the reaction product was compound of the formula (9) as shown in the reaction scheme below.

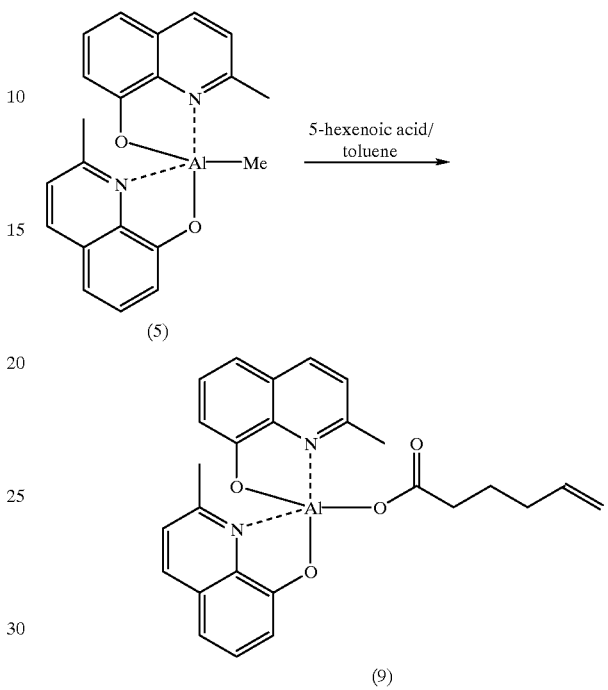

15 mg of Brookhart catalyst of the formula (13) shown above was further added. They were transferred to a 100-ml pressure vessel, to which, while stirring, 2 MPa of ethylene was introduced. At stirring 0.8 g of methylaluminoxane (available from Tosoh-Akzo Co. Ltd.) was added and stirring was continued for 4 hours.

This was allowed to open to the atmosphere, and precipitation was effected by ethanol acidified with hydrochloric acid (12 N hydrochloric acid, 10 ml, was added to 50 ml ethanol). After filtration, the precipitate was washed with ethanol and dried in vacuo to give 290 mg of a reaction product. This reaction product was further refluxed in the ethanol acidified with hydrochloric acid for 1 hour. After filtration, the product was washed with ethanol and dried in vacuo to give the final product.

The infrared absorption spectrum of the final product was measured by the KBr method, and its $^{13}$C-NMR spectrum was measured by dissolving the final product in deuterio-o-dichlorobenzene at 120° C. These results indicated that the final product was an ethylester of a copolymer of ethylene and 5-hexenoic acid and the introduction rate of 5-hexenoic acid into the resultant polymer was 2%.

As has been explained in the foregoing, coordination polymerization is possible even with the monomer having a functional group capable of releasing a proton, that lowers the reactivity of a coordination polymerization catalyst, according to the method for producing a polymer of this invention.

What is claimed is:
1. A method for producing a polymer by coordination polymerization, comprising the steps of:
reacting an unsaturated polar monomer having a functional group releasing a proton or a salt of said unsat- urated polar monomer, with a masking agent comprising an organometallic compound of the general formula (I) capable of masking said functional group to form a corresponding masked monomer;

$$R_n\text{—}M\text{—}X_m \quad \text{(I)}$$

wherein M is a metal selected from the group consisting of Li, Mg, Ca, Sc, Ti, V, Cr, Fe, Ni, Cu, Zn, Co, Al, Si, Y, Zr, Rh, Pd, In, Sn, Sm, and Hf; R is a ligand represented by a compound or an ionic moiety thereof selected from the group consisting of an unsaturated cyclic hydrocarbon, an unsaturated cyclic hydrocarbon having hydroxyl group, an unsaturated heterocyclic hydrocarbon and an unsaturated heterocyclic hydrocarbon having hydroxyl group; X represents a halogen atom; n is an integer of 1 to 5; m is an integer of 1 to 3; "n+m" is an integer of 2 to 6;

further wherein R may be the same or different when n is an integer of 2 to 5; and polymerizing said masked monomer either alone or in combination with another monomer in the presence of the coordination polymerization catalyst to obtain the polymer.

2. The method according to claim 1, wherein said M is Ti or Al.

3. The method according to claim 2, wherein said n is 2 and said m is 1.

4. The method according to claim 1, wherein said M is Ti and said R is unsaturated cyclic hydrocarbon having 3 to 20 carbons or an ionic moiety thereof.

5. The method according to claim 1, wherein said M is Ti and said R is cyclopentadienyl anion.

6. The method according to claim 1, wherein said organometallic compound of the general formula (I) is bis(cyclopentadienyl)titanium halide.

7. The method according to claim 1, wherein said M is Al and said R is unsaturated heterocyclic hydrocarbon having hydroxyl group or an ionic moiety thereof.

8. The method according to claim 1, wherein said M is Al and said R is quinolinyloxy group or alkyl quinolinyloxy group.

9. The method according to claim 1, wherein said organometallic compound of the general formula (I) is bis(methylquinolinolate) aluminum halide.

10. The method according to claim 1, wherein said unsaturated polar monomer has a pKa value of 40 or lower.

11. The method according to claim 1, wherein said functional group releasing a proton of said unsaturated polar monomer is a group selected from the group consisting of carboxyl group, borate group, boronic acid group, phosphate group, phosphonic acid group, phosphinic acid group, sulfone group, hydroxyl group, amide group, imino group, imide group, amino group, cyclopentadienyl group, sulfonamide group and sulfonimide group.

12. The method according to claim 1, wherein said functional group releasing a proton of said unsaturated polar monomer is carboxyl group or hydroxyl group.

13. The method according to claim 1, wherein said another monomer is an olefin monomer.

14. The method according to claim 1, further comprising the step of removing said masking agent from the polymer.

15. A method for producing a polymer by coordination polymerization, comprising the steps of:

reacting an unsaturated polar monomer having a functional group releasing a proton or a salt of said unsaturated polar monomer, with a masking agent comprising an organometallic compound of the general formula (II) capable of masking said functional group to form a corresponding masked monomer;

$$R^1\text{—Al}\text{—}[\text{O—}R^2]_2 \quad \text{(II)}$$

wherein $R^1$ is a monovalent organic group having 1–6 carbons and $R^2$ is a group selected from an unsaturated heterocyclic hydrocarbyl group and a phenyl group substituted with one or more organic groups having 1 or more carbons wherein the substitution at least takes place at the 2- or the 6-position of phenyl ring; and polymerizing said masked monomer either alone or in combination with another monomer in the presence of the coordination polymerization catalyst to obtain the polymer.

16. The method according to claim 15, wherein said substituted phenyl group is a group of the general formula (III)

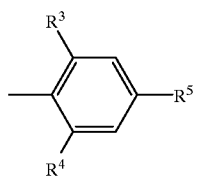

(III)

wherein $R^3$ and $R^4$ may be the same or different and each represents a monovalent organic group having 1–6 carbons and $R^5$ is a hydrogen atom or a monovalent organic group having 1–3 carbons.

17. The method according to claim 16, wherein said $R^3$ and $R^4$ are t-butyl group.

18. The method according to claim 15, wherein said unsaturated heterocyclic hydrocarbyl group is quinolinyl group or alkyl quinolinyl group.

19. The method according to claim 18, wherein said alkyl quinolinyl group is methylquinolinyl group.

20. The method according to claim 15, wherein said unsaturated polar monomer has a pKa value of 40 or lower.

21. The method according to claim 15, wherein said functional group releasing a proton of said unsaturated polar monomer is a group selected from the group consisting of carboxyl group, borate group, boronic acid group, phosphate group, phosphonic acid group, phosphinic acid group, sulfone group, hydroxyl group, amide group, imino group, imide group, amino group, cyclopentadienyl group, sulfonamide group and sulfonimide group.

22. The method according to claim 15, wherein said functional group releasing a proton of said unsaturated polar monomer is carboxyl group or hydroxyl group.

23. The method according to claim 15, wherein said another monomer is an olefin monomer.

24. The method according to claim 15, further comprising the step of removing said masking agent from the polymer.

* * * * *